United States Patent [19]

Nazarathy et al.

[11] Patent Number: 5,278,923
[45] Date of Patent: Jan. 11, 1994

[54] CASCADED OPTICAL MODULATION SYSTEM WITH HIGH LINEARITY

[75] Inventors: Moshe Nazarathy, Palo Alto; Yishai Kagan, Sunnyvale; Yaron Simler, Richmond, all of Calif.

[73] Assignee: Harmonic Lightwaves, Inc., Santa Clara, Calif.

[21] Appl. No.: 939,940

[22] Filed: Sep. 2, 1992

[51] Int. Cl.$^5$ .............................................. G02B 6/10
[52] U.S. Cl. .......................................... 385/3; 385/1; 385/2; 385/8
[58] Field of Search ............................ 385/1, 2, 3, 4, 8

[56] References Cited

U.S. PATENT DOCUMENTS

| | | | |
|---|---|---|---|
| 5,002,353 | 3/1991 | Johnson | 350/96.14 |
| 5,031,235 | 7/1991 | Raskin et al. | 455/612 |
| 5,101,450 | 2/1992 | Olshansky | 385/40 |
| 5,148,503 | 9/1992 | Skeie | 385/3 |
| 5,161,206 | 11/1992 | Djupsjöbacka | 385/2 |
| 5,168,534 | 12/1992 | McBrien et al. | 385/2 |

OTHER PUBLICATIONS

Skeie et al., "Linearization of E-O Modulators by a Cascade Coupling of Phase Modulating Electrodes", SPIE vol. 1583 pp. 153-164, Sep., 1991.
Halvor Skeie and Richard V. Johnson, "Linearization of electrooptic modulators by a cascade coupling of phase modulating electrodes", SPIE Proceedings, vol. 1583, Integrated Optical Circuits, Sep. 3-4, 1991, Boston, Mass., pp. 153-164.
J. F. Lam and G. L. Tangonan, "A novel optical modulator system with enhanced linearization properties", IEEE Transactions, Photonics Technology Letters, vol. 3, No. 12, pp. 1102-1104 Dec. 1991.
Z. Q. Lin and W. S. C. Chang, "Waveguide modulators and extended linear range—a theoretical prediction", Photonics Technology Letters, vol. 2, No. 12, Dec. 1990.
M. L. Farwell, et al., "An electrooptic intensity modulator with improved linearity", IEEE Photonics Technology Letters, vol. 3, No. 9, pp. 792-795, Sep. 1991.

*Primary Examiner*—Frank Gonzalez
*Assistant Examiner*—Stephen W. Barns
*Attorney, Agent, or Firm*—Schneck & McHugh

[57] ABSTRACT

An optical modulation system having cascade-coupled electro-optic modulator stages in either dual tandem or split tandem configurations. An electrical splitter derives multiple electrical drives for the multiple stages from a single modulating input signal. The multiple drive signals are linearly related in magnitude and preferably induce simultaneous antiphase (180° out-of-phase) optical modulation in the tandem stages. While a double Mach-Zehnder cascade configuration could be used, at least one modulator stage might instead be a balanced-bridge interfometer-type modulator having at least one directional coupler. At least one directional coupler in such a configuration may be a $\Delta\beta$ coupler. Application of bias voltages to the interferometer sections and to coupler sections by means of a parametric feedback loop is done in order to simultaneously enhance the linear modulation coefficient, minimize odd order distortions and null the even order distortions that are associated with biased $\Delta\beta$ couplers.

38 Claims, 17 Drawing Sheets

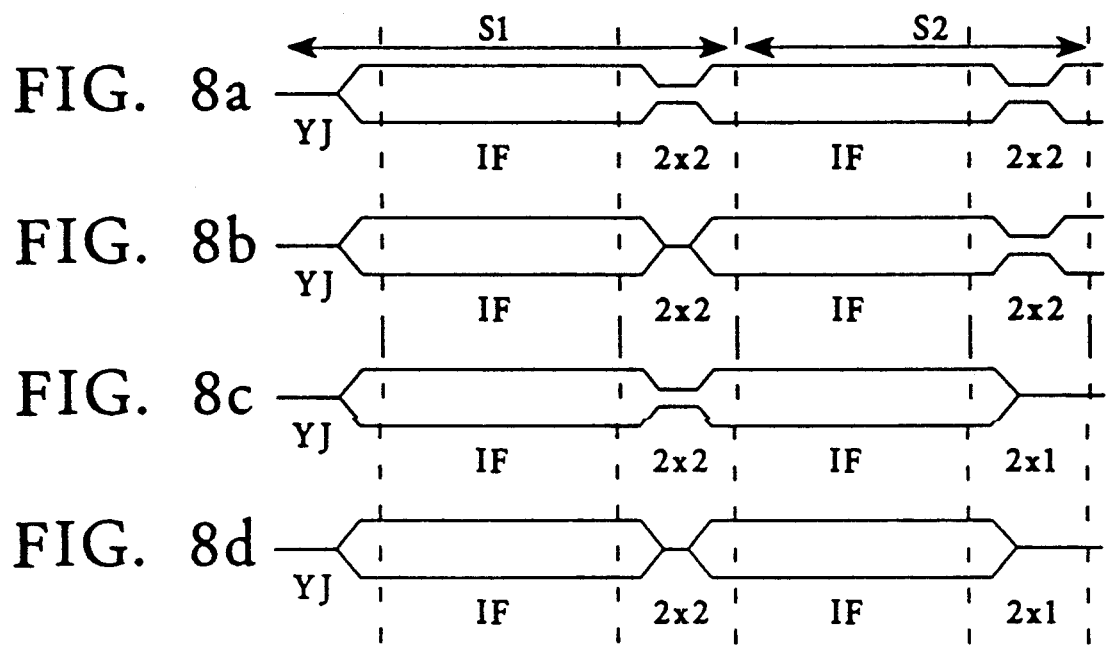
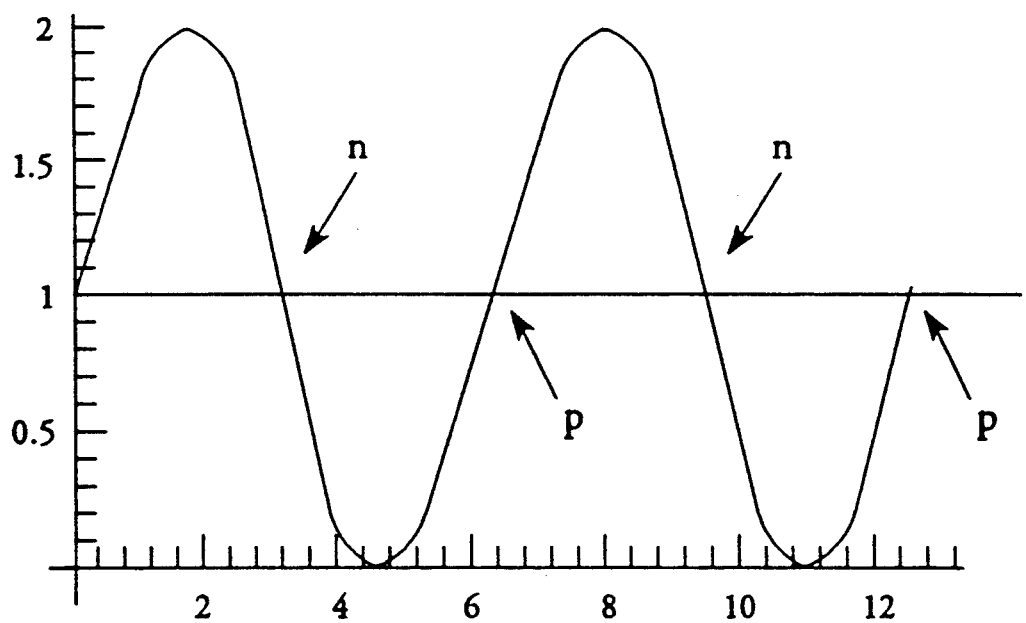
FIG. 10

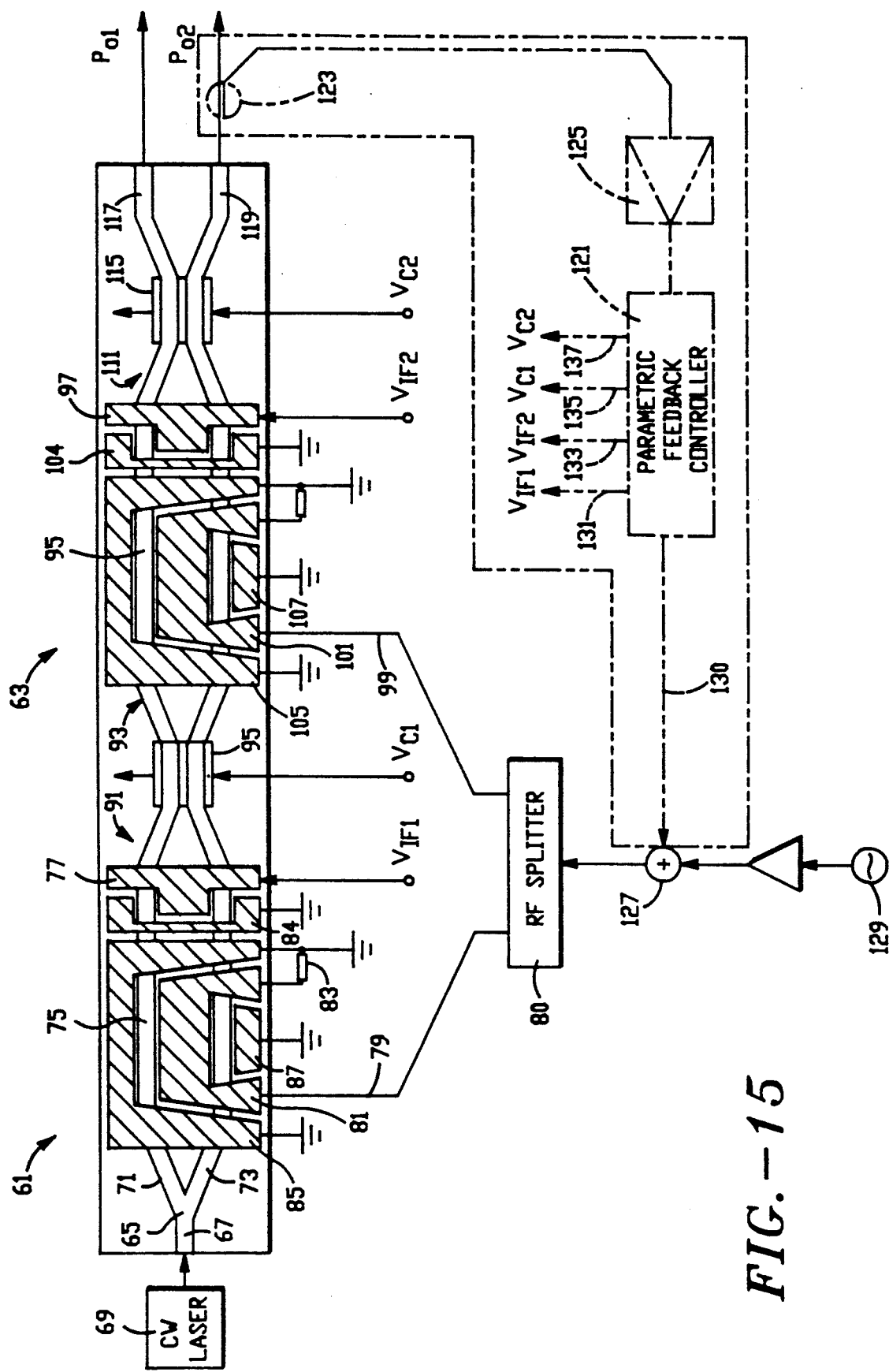

CASCADED OPTICAL MODULATION SYSTEM WITH HIGH LINEARITY

TECHNICAL FIELD

The invention relates to integrated electro-optic modulators having multiple modulation cells and in particular to modulators designed to minimize non-linear distortion for multichannel AM fiber optic amplitude modulation schemes.

BACKGROUND ART

Optical modulators of interest in the present invention are integrated optical waveguide structures which may be considered as having an input section, a central phase modulating interferometer (IF) section and an output section. The input and output sections may be either Y-junction (YJ) optical waveguide structures (YJ splitter with one input waveguide dividing into two output waveguides or YJ combiner wherein two input waveguides merge into a single output waveguide) or optical directional couplers (DC) which are 2×2 optical ports having paired coupled waveguides. One type of optical modulator of interest is the Mach-Zehnder (MZ) modulator. This has a YJ splitter input section, a central IF section and a YJ combiner output (YJ-IF-YJ in our notation). Another type of optical modulator of interest is the balanced bridge modulator (BBI). This has three possible configurations: (1) YJ-IF-DC, (2) DC-IF-YJ or (3) DC-IF-DC. Note that at least one of the end sections is always a DC section. Another way of characterizing these devices is in terms of the number of input and output waveguide ports, i.e. the MZ is 1×1, the BBI is 1×2, or 2×1, or 2×2. For a 2×2 BBI both input ports can be used or one input port may be unused effectively utilizing the device in a 1×2 mode of operation.

In prior art, two modulators have been connected both in series or in parallel, in an effort to improve linearity of the light power vs. modulating voltage transfer characteristic over a wide bandwidth operation range. In the dual parallel schemes, the outputs of two modulators are combined either incoherently or coherently or two orthogonal polarizations of the same modulator structure are combined to serve as the equivalents of two different parallel modulators. FIG. 1 shows a dual parallel modulator with YJs 21, bias electrodes 23, RF electrodes 25 and a phase modulator 27.

In the parallel connection scheme the two modulators (or the two orthogonal polarizations of a single modulator) are generally driven with different drive voltages or are designed to have different modulating efficiencies, often achieved through the use of different electrode lengths, and are fed with different optical powers, such that the net result is to subtract the nonlinear distortion terms generated in the two modulators. Unfortunately, this occurs at the expense of the desired linear drive signals being partially cancelled. In addition, such schemes yield a higher optical loss and require a higher RF drive power. Other problems have to do with the electrical and acoustical cross-talk between the two sections which, because of the parallel layout, are in close proximity to one another and are oriented broadside with respect to acoustic radiation coupling.

In the serial connection schemes, directional couplers with sub-sections are used with electrodes connected to several sub-sections. In these implementations, the modulating signal, typically a radio frequency (RF) drive, is applied to one electrode sub-section only and the other sub-sections are either un-modulated or DC biased.

In a paper entitled "*Linearization of Electro-Optic Modulators by a Cascade Coupling of Phase Modulating Electrodes*" by H. Skeie and R. V. Johnson, published in *SPIE, Vol. 1583, Integrated Optical Circuits* (1991), p. 153-164 the authors disclose parallel and cascade coupling of two modulators. FIG. 2 shows structures illustrated in the paper where FIG. 2a is a tandem MZ configuration with a first input YJ 31, a bias electrode 33, a first IF 35 and a first YJ output 37 joined to a second input YJ 32, a second bias electrode 34 and IF 36 and a second output YJ 38. In FIG. 2b, a MZ modulator 41, similar to the first MZ of FIG. 2a is connected through a bias electrode 43, an IF 45 to an output YJ 47. The second modulator formed by DC 48, bias electrode 42, IF 44 and YJ 46 is a BBI used in a 1×1 fashion. FIG. 2c shows a MZ modulator 51 coupled to a BBI modulator 53 as in FIG. 2b, except that the output section 55 is a DC. Lastly, the authors disclose in FIG. 2d a BBI modulator 61 coupled to another BBI modulator 63 and they note that the second stage is identical to the first.

Modulator L-V transfer characteristic—linearity and distortion specifications

Modulator linearity and the residual nonlinear distortion are specified in terms of the harmonic response of the power series expansion of the L-V (Light power vs. modulation Voltage) transfer characteristic. The background material reviewed here sets the mathematical notation and is well known prior art with the exception of the normalizations of power series coefficients introduced for meaningful comparison criteria among different devices.

Any electro-optic modulator (FIG. 3) can be described as a system with an optical input port where typically un-modulated CW light power $P_{in}$ is injected, an optical output where modulated optical power $P_o(t)$ is collected, and an electrical modulating port where a modulating voltage signal $v(t)$ is applied. The L-V characteristic is a relation between these three quantities, with $P_{in}$ considered a parameter:

$$P_o(v) = P_{in} Q(v) \tag{1}$$

The output power is linear in the input power but is generally nonlinear in the modulating voltage, and it is our objective to reduce this nonlinearity.

The power series expansion of the transfer characteristic (Eq. 1) can be expressed as $$P_o = \bar{P}(1 + d_1\phi + d_2\phi^2 + d_3\phi^3 + \ldots) \tag{2}$$

where $\phi$ is a normalized voltage expressing the interferometric phase retardation $$\phi = \frac{\pi}{V_\pi} v \tag{3}$$

$\nu$ is the modulating voltage applied to the interferometer electrodes, $V_\pi$ is a constant called half-wave voltage—the voltage required to produce $\pi$ phase change in $\phi$ $$\overline{P} = \frac{P_{in}}{\Lambda} \quad (4)$$

$\overline{P}$ is the average output optical power, $P_{in}$ is the input optical power, and $10 \log_{10}(\Lambda)$ represents the device optical insertion loss in dB. In this disclosure, the even and third order distortions are substantially nulled rendering the dominant distortion to be the residual fifth order one. The L-V characteristic expressed in a power series with only odd terms, starting with the fifth order one is, $$I(\phi) = \frac{P_o(\phi)}{\overline{P}} = (1 + d_1\phi + d_5\phi^5 + \ldots) \quad (5)$$

where we introduced normalized optical intensity $I(\phi)$ as the ratio of optical power to average power.

Assume now that the modulation signal is a sum of sinusoidal tones $$\nu(t) = V_o \sum_m \cos(\omega_m t + \phi_m) \quad (6)$$

thus $$\phi(t) = \frac{\pi \nu(t)}{V_\pi} = \beta \sum_m \cos(\omega_m t + \phi_m) \quad (7)$$

and $$\beta = \frac{\pi}{V_\pi} V_o \quad (8)$$

is the modulation index in radians.

Introduce the optical modulation index (OMI) m as the ratio of the peak optical power of each of the sinusoidal carriers ($\overline{P}d_1\beta$) to the average optical power ($\overline{P}$), $$m = \frac{CarrierPeakOptPWR}{AverageOptPWR} = d_1\beta \quad (9)$$

For a given transmitted average power, it is the OMI that determines the carrier to noise ratio. To compare two systems with the same carrier to noise ratio in terms of their nonlinear distortions, one would drive both to the same OMI.

Using the formalism above it is possible to show that the ratio of the fifth order intermodulation term to the carrier is proportional to $d_5^{norm} m^4$, where $$d_5^{norm} = \frac{d_5}{d_1^5} \quad (10)$$

is a normalized fifth order coefficient which can be used as a figure of merit to compare two different systems both driven to the same modulation index m in terms of the strengths of their fifth order intermodulation distortion.

For a given average optical power $\overline{P}$ the amplitude in the optical power domain of each of the carriers is given by $$\overline{P}m = \overline{P}d_1\beta = \overline{P}d_1 \frac{\pi}{V_\pi} V_o \quad (11)$$

Therefore it is advantageous to maximize the linear modulation coefficient $d_1$ and reduce the drive voltage $V_\pi$ as well as increase the average optical power $\overline{P}$ by reducing the insertion loss $\Lambda$.

Mathematical description of optical two-ports

The directional coupler and the two-arm interferometer are optical two-port devices. A generic two-port integrated optical device is illustrated in FIG. 4. It can be mathematically described in terms of a two-port transfer matrix M relating the electric fields at the two waveguide input ports 65 and 67 with the electric fields at the two waveguide output ports 71 and 73:

$$M \begin{bmatrix} E_1 \\ E_2 \end{bmatrix} = \begin{bmatrix} E'_1 \\ E'_2 \end{bmatrix} \quad (12)$$

Directional coupler (DC)

Consider a directional coupler consisting of two closely spaced waveguides, generally with biasing electrodes. The well known coupled mode equations describe the evolution of the E-fields along a coupler and the exchange of energy between the two waveguides. Let $\kappa$ denote the coupling coefficient per unit length between the waveguides and $\delta$ denote the asynchronism coefficient which is proportional to the applied voltage and to the induced phase difference per unit length between the two coupler arms, $$\delta = \frac{\beta_1 - \beta_2}{2} = \frac{\Delta\beta}{2} = R\nu \quad (13)$$

with R some proportionality constant. Throughout the document $\Delta\beta$ and $\delta$ will be used somewhat interchangeably.

A coupler with $\delta=0$ is called symmetric and a coupler with nonzero $\delta$ is called asymmetric. The asymmetry may be structural-unequal waveguides (differing in cross-sectional dimensions and/or refractive indexes) or for the so-called $\Delta\beta$ coupler it may be an asymmetry induced by the applied voltage on the electrodes. The general solution to the coupled mode equations is represented in terms of a two-port transfer matrix $C[\kappa\delta]$ given by $$C[\kappa, \delta] = \begin{bmatrix} \hat{K}e^{j\Delta} & jK \\ jK & \hat{K}e^{-j\Delta} \end{bmatrix} = \begin{bmatrix} \cos(\Gamma)e^{j\Delta} & j\sin(\Gamma) \\ j\sin(\Gamma) & \cos(\Gamma)e^{-j\Delta} \end{bmatrix} \quad (14)$$

wherein using the notation $$\gamma = L\sqrt{\delta^2 + \kappa^2} \quad (15)$$

the parameters $\Gamma, \Delta, K, \hat{K}$ are expressed as $$\Gamma = \arcsin\left(\frac{\kappa L}{\gamma} \sin(\gamma)\right) \tag{16}$$

$$\Delta = \tan^{-1}\left(\frac{\delta L}{\gamma} \tan(\gamma)\right) \tag{17}$$

$$K = \sin(\Gamma) = \kappa L \frac{\sin(\gamma)}{\gamma} \tag{18}$$

$$\hat{K} = \sqrt{1 - K^2} = \cos(\Gamma) \tag{19}$$

$$\hat{K} e^{j\Delta} = \cos(\gamma) + j\frac{\delta L}{\gamma} \sin(\gamma) \tag{20}$$

From Eq. 13 it is apparent that as the coupler is made more asymmetric e.g. by applying bias voltage and causing a $\Delta\beta$ difference, the magnitude of the cross-over coefficient K diminishes according to a $\sin(\gamma)/\gamma$ function.

As a special case of the equations above, consider a symmetric coupler $\delta = 0$ for which $\Gamma = \gamma = \kappa L$, $K = \sin(\gamma)$ and $\Delta = 0$. In this case the coupler can be interchangeably described by its coupling ratio K or its coupling angle $\gamma$. For the asymmetric $\Delta\beta$ coupler, the coupling ratio is defined by the analogous coupling angle $\Gamma$ but a full description of the coupler must consider the phase shift $\Delta$ as well. Occasionally we also describe a coupler by its power cross-over ratio $K^2$, e.g. a 50%/50% coupler.

Push-pull phase modulating interferometer matrix (IF)

An interferometer (IF) transfer matrix corresponds to pure phase shifts with no cross-coupling between the two waveguides $$F[\phi] = \begin{pmatrix} e^{j\frac{\phi}{2}} & 0 \\ 0 & e^{-j\frac{\phi}{2}} \end{pmatrix} \tag{21}$$

with $\phi$ the differential phase retardation between the two arms. Control of the device requires applying some static bias voltage $V_b$ to the interferometer electrodes, thus in the most general case of interferometer matrix is $F[\phi + \eta]$ with $$\eta = \frac{\pi}{V_\pi} V_b$$

the static bias phase.

The objectives of the invention are the design of modulator devices and related bias and tuning systems to improve the following performance criteria:
1) reduce the nonlinearities over a broad frequency band.
2) maximize the modulation efficiency i.e. maximize the linear modulation coefficient and minimize the half-wave drive voltage and the optical losses.
3) attain the ability to electronically tune the device to the above optimum operating point in the wake of the inevitable process irregularities.

DISCLOSURE OF THE INVENTION

The goals of the invention are met by an electro-optical modulator with a plurality of modulating stages cascaded together in a tandem arrangement. The stages are driven by simultaneous modulating electrical signals. In particular, the modulating voltages may be derived from a single input source by means of an electrical power splitter with at least two outputs in contrast to the previous art serial device architectures (J. F. Lam and Gregory L. Tangonon, also Z. Q. Lin and W. S. C. Chang also M. L. Farwell and Z. Q. Lin) wherein a single modulating electrical signal would be applied to one section but a biasing electrical signal or no bias at all would be applied to one or more additional sections.

To achieve the objectives of the invention we disclose the following new elements:
A) Dual tandem and split tandem architectures with multiple electrical drives.
B) Device broadband operation achieved by means of balanced splitting ratios i.e. dual electrical drives that are equal in magnitude and either in phase or 180° out of phase.
C) Choice of coupler coefficients which are optimal for the reduction of odd order distortions and simultaneously for the enhancement of the linear modulation coefficient.
D) Usage of voltage-tunable $\Delta\beta$ couplers (with the $\Delta_\kappa$ couplers covered as a special case) to enhance the tunability of the couplers such that the device could be biased at its optimum operating regime.
E) Application of bias voltages to the interferometer sections and to couplers by means of parametric feedback loops in order to null the even order distortions of the device as associated with $\Delta\beta$ couplers while minimizing odd order distortions.

BRIEF DESCRIPTION OF DRAWINGS

FIG. 2 depicts modulator structures illustrated in the reference Skeie and Johnson.

FIG. 5 depicts the various dual tandem devices obtained by cascade connection of BBI (Balanced Bridge Interferometers) and/or MZ (Mach-Zehnder) devices.

FIG. 8 shows an alternative mode of partitioning dual tandem devices into two stages, the first stage (S1) ending in a type I or type II 2×2 optical connecting port and the second stage ending in a 2×1 or 2×2 port.

FIGS. 8a,c shows type I devices.

FIGS. 8b,d shows type II devices.

FIG. 10 illustrates the raised sine transfer characteristic of single MZ or BBI stages with bias points of positive slope and negative slope whereat the even order distortion is nulled.

FIG. 11 depicts two possible realizations of split tandem devices.

FIG. 15 depicts the preferred embodiment of a linearized transmission system based on a double BBI dual tandem optical modulator with its balanced electrical splitter driver and the parametric control circuitry for closed loop biasing the apparatus in order to substantially null even and third order distortions, minimize the fifth order distortion and maximize the linear modulation coefficient.

FIG. 22 is a contour plot of $d_1$ for the $\rho$:1 splitter. Brighter means higher values, the maximum occurs on the horizontal lower axis.

FIG. 23 is a contour plot of $d_1$ for the 1:$\rho$ splitter. Brighter means higher values, the maximum occurs on the horizontal lower axis.

FIG. 24 is a contour plot of $d_5^{norm}$ for the $\rho$:1 splitter. Brighter means lower values, the minimum occurs on the horizontal lower axis, the other minimum in the upper right corner is to be discarded as it falls in the forbidden region of mathematically meaningless solutions as indicated in FIG. 26.

FIG. 25 is a contour plot of $d_5^{norm}$ for the 1:$\rho$ splitter. Brighter means lower values, the absolute minimum is only 2% different from the minimum along the lower horizontal axis.

FIG. 26 indicates how the $\rho-K_2$ plane should be partitioned into a meaningful and a forbidden region with respect to solutions of the optimization problem over the two coupler ratios $K_1$, $K_2$ and the splitter ratio $\rho$.

BEST MODE FOR CARRYING OUT THE INVENTION

In accordance with the teachings of this invention, the electro-optic modulator with enhanced linear range is obtained by cascading modulator devices in series or in tandem. The specific subset of linearized optical modulators claimed as the invention yields better performance criteria than prior art devices and includes two main generic types of structures of optical tandem connection. These are classified in Table 1, displaying interconnected MZ and BBI sections as indicated in the symbolic notation wherein the arrow indicates a cascaded butt-coupling of the output waveguides of one modulator to the input waveguides of the next one to form an integrated device and the "×" indicates a fan-out or fan-in.

TABLE 1

Dual tandem class of embodiments:

$1 \times N \longrightarrow N \times M \quad N = 1, 2 \quad M = 1, 2$

Split tandem class of embodiments:

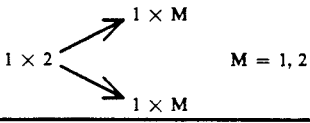

$M = 1, 2$

Figure 6:
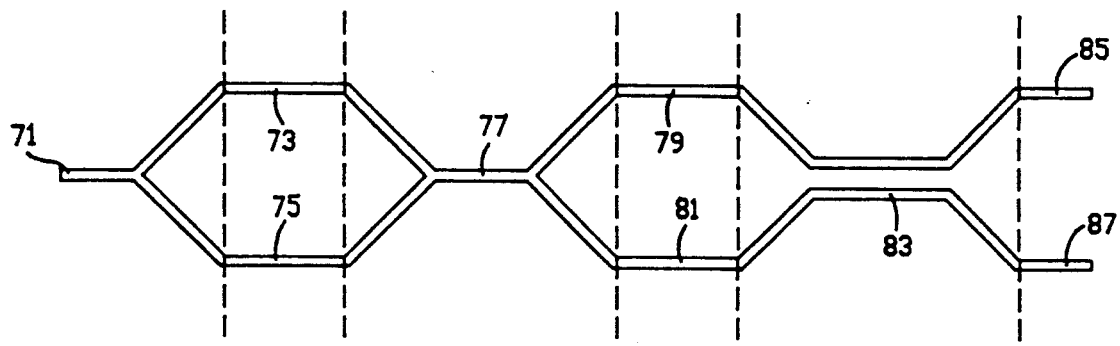
FIG. 6 is a detailed diagram for the optical paths of the MZBBI device.
Figure 7:
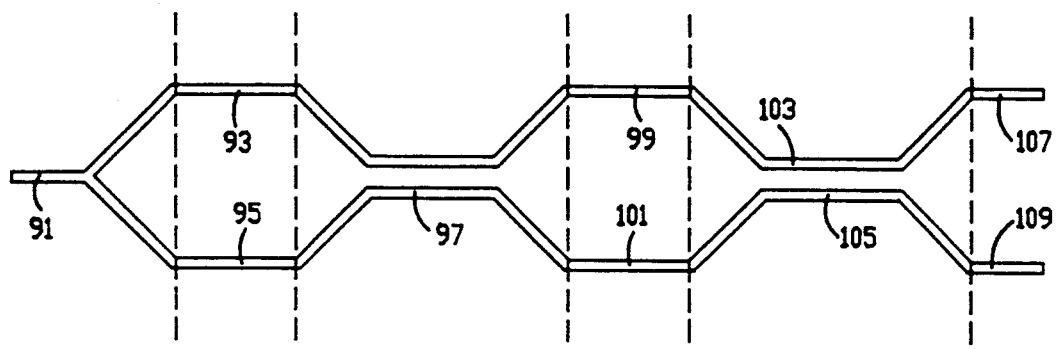
FIG. 7 is a detailed diagram for the optical paths of the DBBI device.

Four special cases of dual tandem devices are summarized in FIG. 5a through FIG. 5d, where DMZ and DBBI mean Double MZ and Double BBI respectively, and MZBBI and BBIMZ are the obvious cascades of a MZ and a BBI. Detailed diagrams for the optical paths of the MZBBI and DBBI devices are presented in FIG. 6 and FIG. 7, respectively. FIG. 6 consists of a MZ (waveguides 71, 73, 75 and 77) serially connected with a BBI (77, 79, 81 and 83) which terminates in the DC (83) with two waveguide output ports 85 and 87. The DBBI depicted in FIG. 7 consists of two cascaded BBIs (91 through 97 cascaded with 97 through 109).

The partition into two stages of the overall device is somewhat arbitrary. Another point of view is shown in FIG. 8 wherein the first stage (S1) is taken to include a 2×2 optical connecting port which in FIG. 8b and FIG. 8d consists of a YJ splitter cascaded with a YJ combiner (Type I) and in FIG. 8a and FIG. 8c, S1 consists of a DC (Type II). The two types can be differentiated by the waveguides connecting the input port and the output port of the 2×2 port. For a type I device there is a single waveguide bridging the two ports, whereas for a type II device there are two waveguides in the middle region of the 2×2 port.

Figure 1:
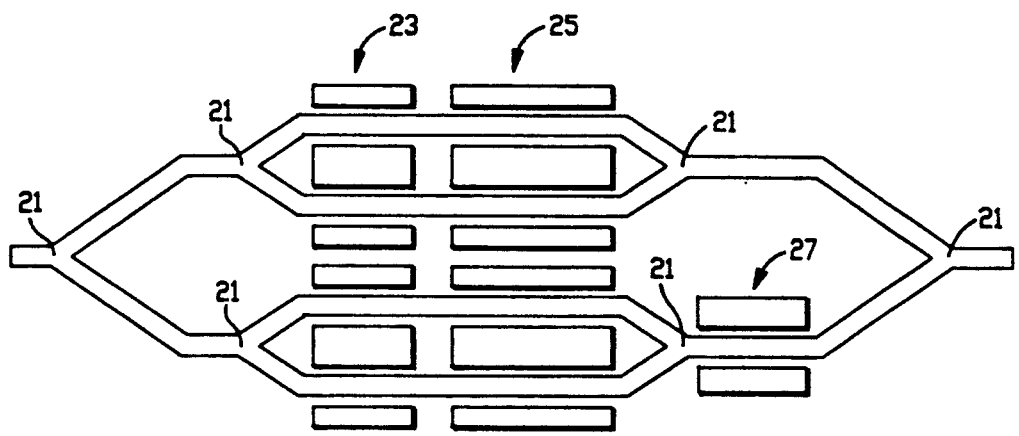
FIG. 1 depicts a prior art dual parallel modulator, obtained by optically connecting two Mach-Zehnder modulators in parallel.
Figure 2A:
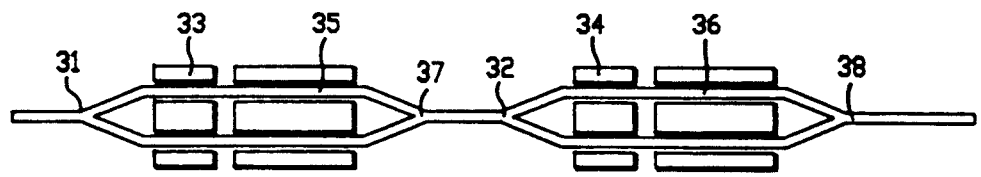
FIG. 2a is a tandem MZ configuration
Figure 2B:
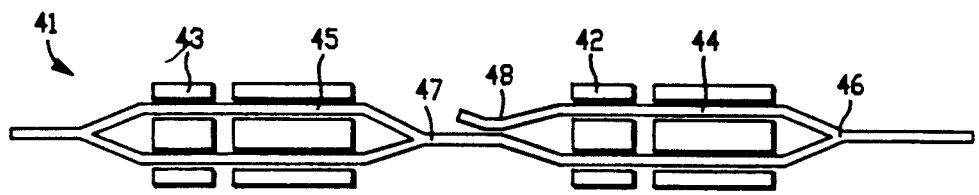
FIG. 2b is another is a tandem MZ configuration using a directional coupler with one unconnected port.
Figure 2C:
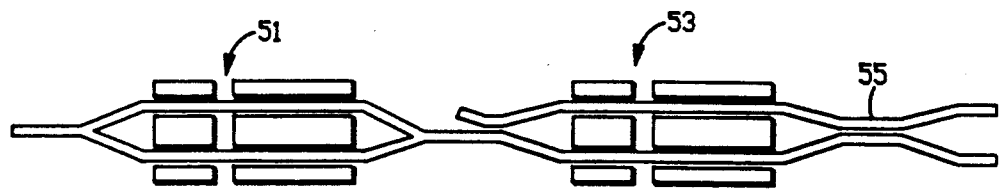
FIG. 2c shows a MZ modulator coupled to a BBI modulator.
Figure 2D:
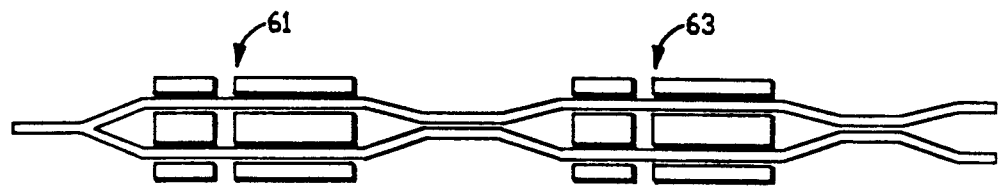
FIG. 2d shows a BBI modulator coupled to another BBI modulator.
Figure 3:
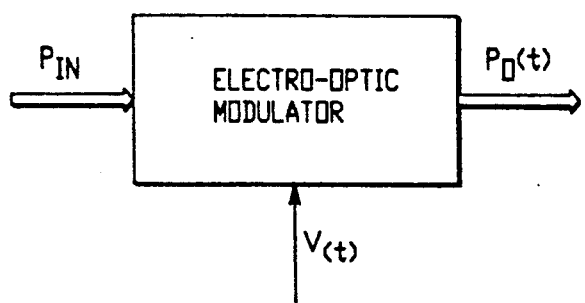
FIG. 3 depicts a general electro-optic modulator with its optical input and output waveguide ports and the electrical modulating signal port.
Figure 4:
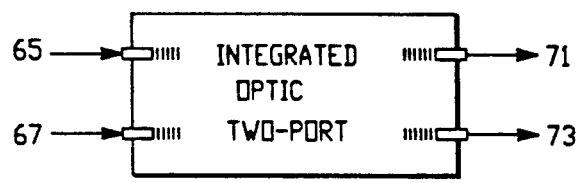
FIG. 4 shows a generic two-port integrated optical device.
Figure 5A:
FIG. 5a is a Double MZ cascade.
Figure 5B:
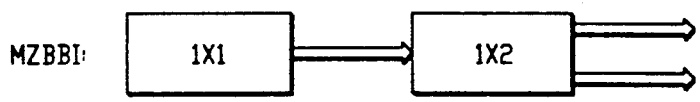
FIG. 5b is a cascade of MZ and BBI
Figure 5C:
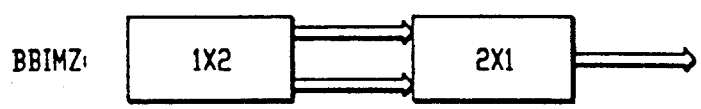
FIG. 5c is a cascade of BBI and MZ.
Figure 5D:
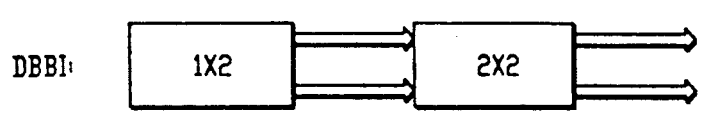
FIG. 5d is a Double BBI cascade.

Another possibility for realizing the 2×2 connecting port for Type I devices is to cascade a combiner with a coupler rather than with a splitter, wherein one input port of the coupler is unused as in FIG. 2b and FIG. 2c. This realization of the 2×2 connecting port is functionally equivalent to the case of a combiner and a splitter used back to back.

It will be shown that Type I and Type II devices each have a different transfer characteristics but are unaffected by the number of outputs M, i.e. both types can have either M=1 or 2. When M=2, the two outputs are complementary and behave like the single available outputs for M=1 (assuming the same type I or II when comparing M=1 and M=2).

Figure 9:
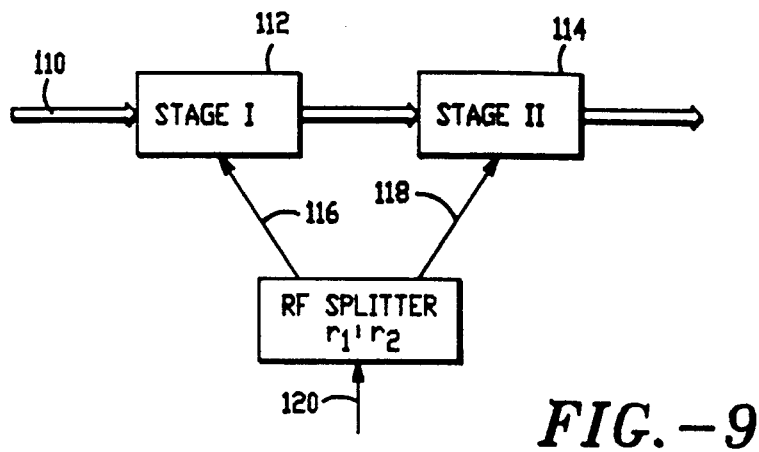
FIG. 9 schematically depicts the electrical splitter to simultaneously drive both ports of the dual tandem devices.

FIG. 9 schematically describes the electrical drive for the dual tandem devices by means of and RF splitter driving both ports simultaneously with split ratio $$\rho = r_1 : r_2 \qquad (22)$$

The voltages 116 and 118 are applied to the modulating electrodes of the respective stages 112 and 114 and are linearly related to the modulating voltage 120. In a simplistic implementation, the splitter could be a multiwinding transformer with turns ratio $r_1:r_2$, although as discussed below, such implementation is not sufficiently broadband and transmission line transformer structures with better performance will be disclosed.

According to the teachings of this invention the two phase retardation modulation signals in the two interferometer sections of the modulator cascade are required to be 180 degrees out of phase (in anti-phase) in order to achieve cancellation of third order nonlinearity.

This does not necessarily mean that the two voltage outputs of the driving electrical splitter must be anti-phase. Neglecting delays, the two electrical outputs of the splitter can be either in phase or anti-phase, depending on the phase biasing of the two modulator stages. The transfer characteristic of the single MZ or BBI stages can have two types of bias points at which the even order distortion is substantially nulled, a positive slope bias or a negative slope bias (points p and n in FIG. 10). When both devices are biased on congruent branches of the L-V characteristics with the same slope (i.e. both stages at p or at n), the splitter must provide anti-phase voltages. Alternatively, if the splitter provides in-phase voltages, then the two devices are to be biased on branches of the L-V characteristics with opposite slopes, and this will effectively yield retardation modulations in anti-phase in the two stages.

A particularly advantageous splitting ratio as will be described in the preferred embodiments is $\rho = \pm 1$ i.e. the two splitter arms are balanced, outputting equal amplitude voltages, either in phase or in anti-phase. This simplifies the structure of the electronic splitter and makes the frequency responses from the main electrical input 120 to the two electrical ports 116 and 118 (FIG. 9) track each other better over a broader band of frequencies resulting in improved suppression of third order nonlinearity. The application of such balanced splitter in conjunction with the corresponding branch biasing of the two devices yields retardation modulation signals in the two stages which are antipodal, i.e. of equal magnitude or opposite phase, provided that relative propagation delays from the two outputs of the splitter to the two input ports of the two modulating stages are properly matched. In fact, in order to yield phase retardation modulations that are truly delay matched, the propagation delays of the two splitter arms are not to be equal but should to be chosen such as to compensate for the time of flight of the light beams between the first and second tandem devices. Such considerations become important at high frequencies of operation.

Figure 11A:
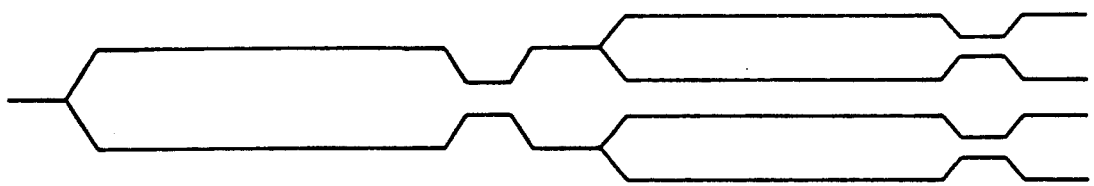
FIG. 11a shows a split tandem device with two outputs comprising a first 1×2 stage branching into two 1×2 branches.
Figure 11B:
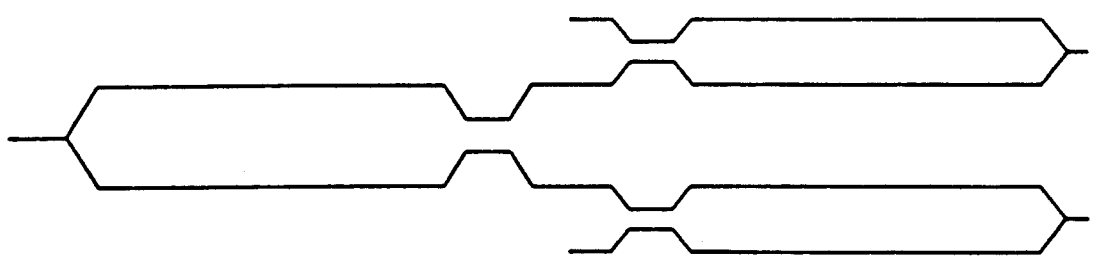
FIG. 11b shows a shows a split tandem device with two outputs comprising a first 1×2 stage branching into two 2×1 branches which are actually used as 1×1 stages with one input port left unconnected.
Figure 12:
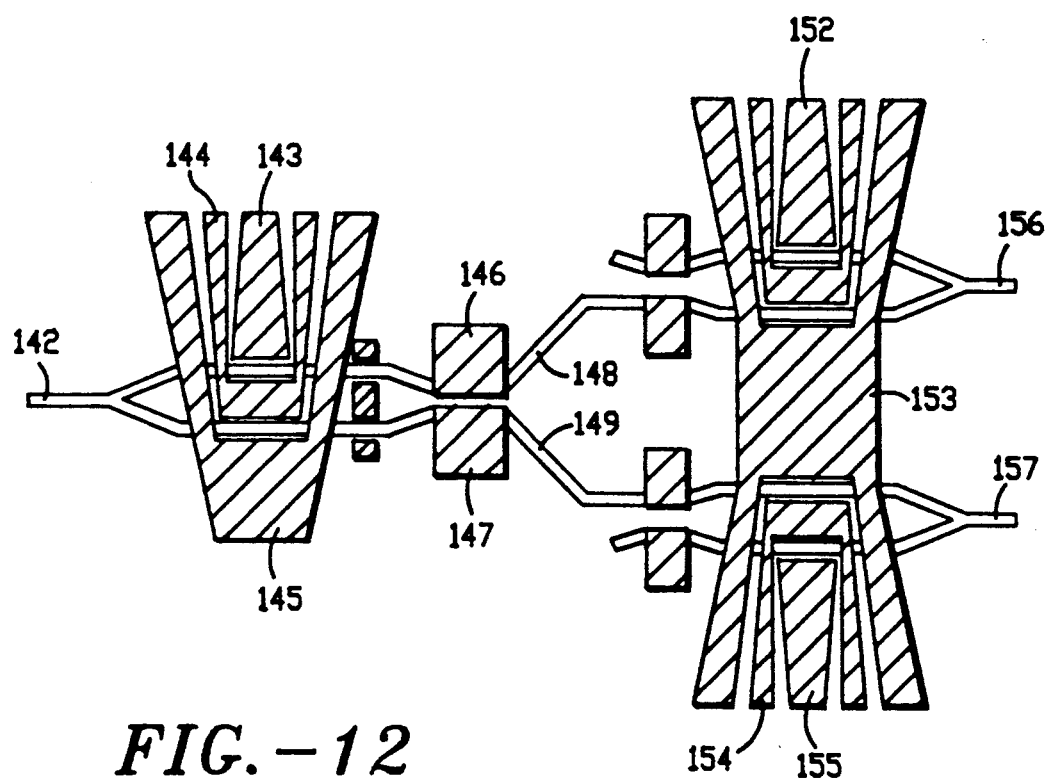
FIG. 12 shows a detailed embodiment of a split tandem device of FIG. 11b.
Figure 13:
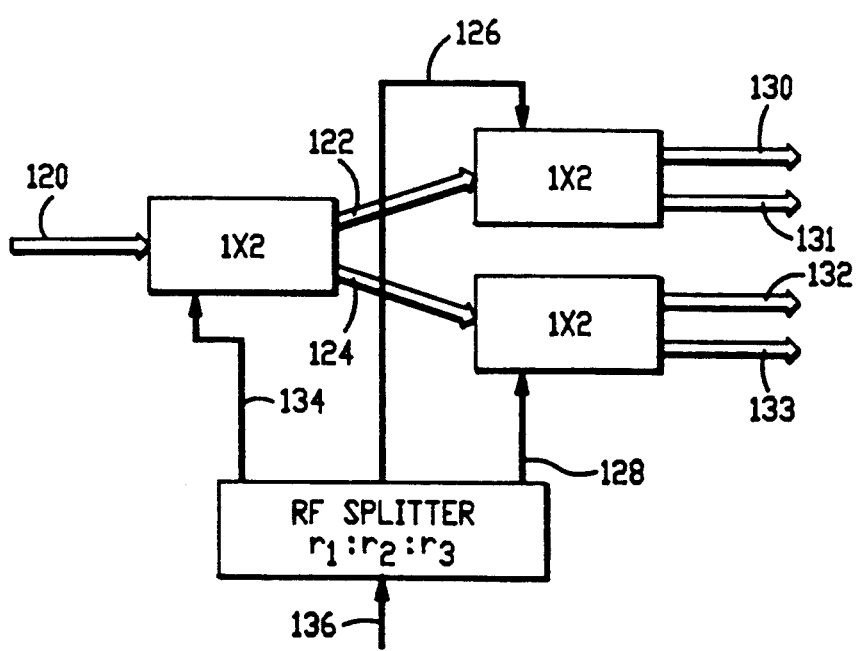
FIG. 13 depicts the electrical drive for split tandem devices.

Split Tandem devices. Notice that according to Table I, these consist of tree-like devices wherein the trunk consists of a first 1×2 stage, the two outputs of each are each followed by two 2×1 or 1×2 branches (FIG. 11a and FIG. 11b). As before it is possible to use 2×M devices for the second stage branches, given that one of the inputs of each such stage remains unused (FIG. 11b). An example of an embodiment of a split tandem device with 2 outputs (M=1) is schematically detailed in FIG. 12. The first stage consists of a BBI (comprising YJ 142, interferometer RF electrode 144 and ground electrodes 143 and 145 which together form a three electrode coplanar transmission line) ending in a coupler biased by electrodes 146 and 147. The coupler two output arms (waveguides 148 and 149) are each connected to 2×1 BBIs with outputs 156 and 157 with IF sections driven by electrodes 152 through 155. The electrical drive for split tandem devices is described in FIG. 13, wherein to illustrate another possible configuration, 1×2 BBI devices are used in the two output stages. In the Figure, light colored lines (120, 122, 124, 130 through 133) represent the optical waveguide ports while dark lines (126, 128 and 134) represent the electrical lines.

The description above presented the architectures for tandem optical modulator devices and electrical drivers for the modulation signals according to the teachings of the invention. To see how such architectures lead to improved performance criteria, a detailed mathematical analysis has been carried out starting with the transfer characteristic for the devices and determining the appropriate values of parameters and bias values for optimized performance. The analysis consists of a comprehensive search in the multidimensional space of device parameters. The results indicate new operating regimes for the devices with better performance with respect to all other known tandem devices. In fact the operating points derived in this invention are optimal in the sense that operating at any other operating regime will result in degraded overall performance.

As shown in Eq. 5, the normalized output power from an optical modulator may be expressed as a power series in the normalized modulating voltage $\phi$. In this invention we disclose the usage of $\Delta\beta$ directional couplers (unlike the work of Skeie and Johnson which uses $\Delta\kappa$ directional couplers) in conjunction with an optimized RF splitter and applying bias voltages to both the IF and directional coupler sections, and teach how to achieve the following optimization of the L-V transfer characteristic (referring to Eq. 5):

Substantially null all even distortion terms: $d_2=d_4=d_6=\ldots=0$.

Substantially null the lowest odd order term- the third order coefficient: $d_3=0$ which amounts to cancelling the third order harmonic and intermodulation distortion over a broad frequency range.

Maximize the first order modulation coefficient: $d_1\rightarrow$Max which amounts to minimizing the drive voltage for the device.

Minimize the fifth order coefficient: $d_5\rightarrow$Min, which amounts to minimizing the fifth order harmonic and intermodulation distortion.

An interesting point is that is may be advantageous to slightly detune of the optimum coupler parameters such that the third order distortion is not entirely nulled but a residual amount of third order intermodulation is kept to compensate the fifth order intermodulation. This slightly detuned mode of operation in the vicinity of the optimum values taught by the invention which null the third order distortion, may improve the operation of the device at certain signal levels, reducing the intermodulation distortion and is implied in the teachings of this invention.

As will be shown below, the drive voltage for the DBBI device described by Skeie and Johnson is 2.5 dB higher and its normalized fifth order distortion is about 0.5 dB worse than that of our DBBI disclosed devices. In a multichannel video transmission application, over a bandwidth of 0.5-1 GHz, the requirement for too high a drive voltage as in Skeie and Johnson may mean that in a practical implementation a broadband amplifier might not even be available to supply the required drive over the broadband frequency range, whereas too high nonlinear distortion limits both the number of channels and the dynamic range and budget loss of the optical link.

We disclose in this invention the usage of tandem devices using asymmetric $\Delta\beta\neq 0$ voltage-tunable couplers in conjunction with applied bias voltages to the RF electrodes by means of parametric feedback control loops in order to tune the device to the optimum linearity point. The mathematical derivation below further establishes why the usage of a $\Delta\beta$ coupler cannot be trivially combined with prior art.

The performance criterion of electrical tunability is very important since it is not likely that a coupler could be accurately fabricated with the precise coupling values necessary to null the third order coefficient, thus requiring coupler final adjustment. Electrical coupler tuning can be accomplished in two ways, by $\Delta\kappa$ tuning or $\Delta\beta$ tuning, the latter being a much stronger effect. However, the theory of operation presented in Skeie and Johnson only assumes $\Delta\kappa$ couplers corresponding to the coupler matrix $C[\kappa, 0]$ in our notation, and making no provision for $\Delta\beta$ coupler tuning. In addition, it is advantageous to consider usage of a $\Delta\beta$ rather than a $\Delta\kappa$ tunable couplers for certain crystal cuts for additional reasons other than the enhanced tuning efficiency. For example, a $\Delta\beta$ coupler in x-cut LiNbO$_3$ is more accurately controlled than a $\Delta\kappa$ coupler and it also offers less optical loss due to the positioning of electrodes alongside the waveguides rather than on top of the waveguides as for a $\Delta\kappa$ tunable coupler. Furthermore, even if pure $\Delta\kappa$ tuning were intended to be used, some parasitic $\Delta\beta$ tuning or built-in bias may appear due to fabrication imperfections. In mathematical terms the general coupler matrix is a function of the applied coupler tuning voltage $V_c$ via both the $\kappa$ and the $\Delta\epsilon$ voltage dependent mechanisms:

$$C[\kappa,\delta] = C[\kappa(V_c),\tfrac{1}{2}\Delta\beta(V_c)] \tag{23}$$

The general asymmetric coupler transfer matrix $C[\kappa, \delta]$(Eq. 14) differs from the symmetric coupler matrix $C[\kappa, 0]$ by the presence of the diagonal phase shifts terms $\pm\Delta$. Therefore, a device wherein a $\Delta\beta(V_c)$ tuning mechanism is present no longer functions as disclosed in the Skeie and Johnson work since second order distortion appears as further analyzed below. The question arises whether it is still possible to cancel out the third order coefficient upon using $\Delta\beta$ couplers and what additional measures are required for that purpose.

Although the ability to tune the magnitude of the coupling coefficients by voltage is evident, it is not a priori clear whether the presence of the extra phase shifts associated with $\Delta\beta$ operation does not foil the operation of the device, in other words whether fourth order and higher order even terms do not appear and whether voltages on the couplers and the interferometer sections need to be simultaneously controlled or are they effectively decoupled. In accordance with the teachings of this invention we have established that it is possible to compensate for the $\Delta\beta$ induced $\pm\Delta$ phase shifts by applying static bias voltages to the electrodes of the two interferometer sections. Under the prescribed interferometer biasing voltages, the transfer characteristic becomes odd shaped and all even order distortion terms disappear.

We disclose the means to make use of the stronger and more advantageous $\Delta\beta$ tuning effect by concurrently applying tuning voltages to the couplers and correcting for second order distortions generated in the process of $\Delta\beta$ tuning by applying bias voltages to the two interferometer sections in order to null out the second order distortions. The voltages on the interferometers are to be applied by means of a parametric closed loop system which nulls out the distortion products in the optical output associated with electrical input pilot tones injected in the input.

Considering the DBBI device, another issue addressed in the disclosure is the setting of the splitting ratios between the electrical signals driving the two sections. The optimization analysis to follow has established that the optimal splitting ratio is 1:−1 hereforth called antipodal splitting, i.e. for optimal operation the IF phase retardation modulating signals must be equal in magnitude and opposite in phase. Such splitting ratio will be shown to result in the lowest possible half-wave drive voltage and substantially minimal fifth order distortion. The splitting ratio of 1:−0.5 in ref. Skeie and Johnson is shown to lead to a worse (higher) drive voltage or lower linear modulation coefficient and worse fifth order nonlinear distortion.

Figure 14A:
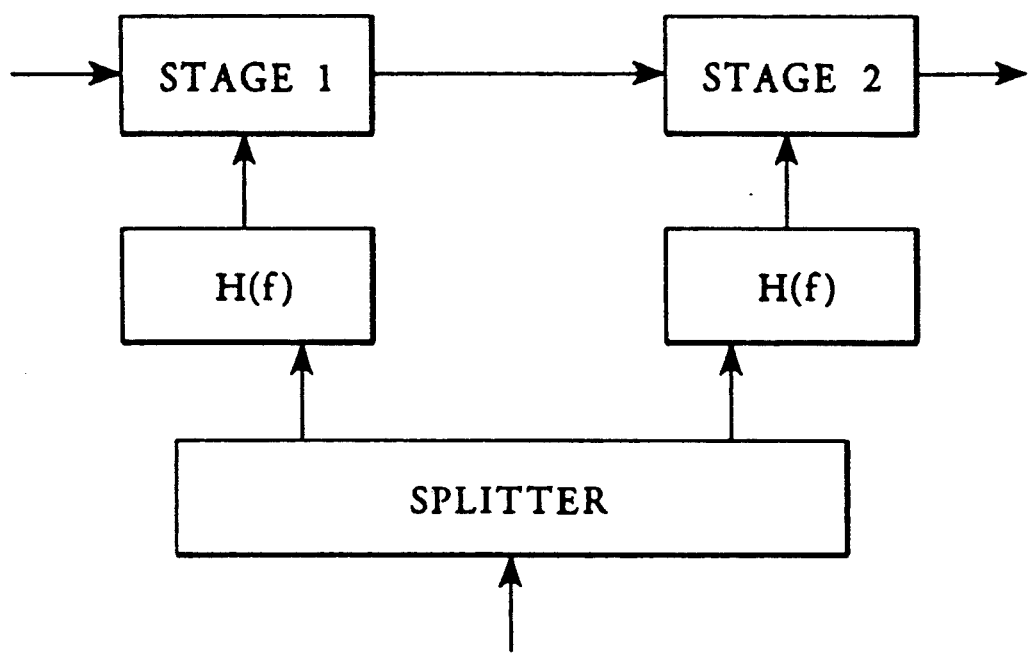
FIG. 14a shows a dual tandem device displaying equal frequency responses from each of the two splitter arms to the lightwave signals.
Figure 14B:
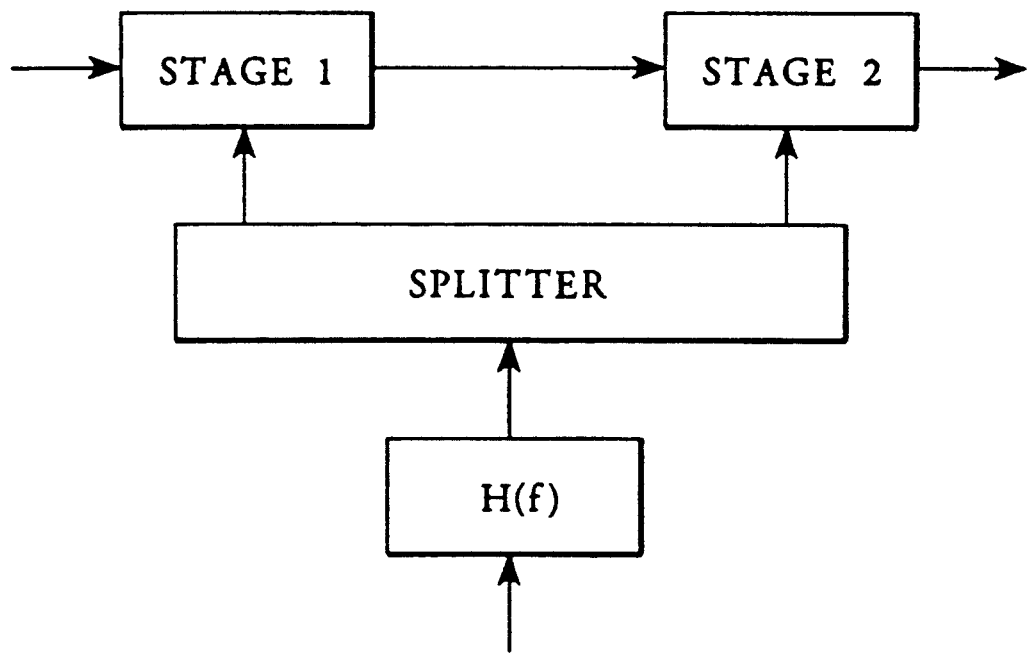
FIG. 14b indicates a system equivalent to that of FIG. 14a which demonstrates the ideality of the system of FIG. 14a in terms of its intermodulation distortion minimization properties being independent of the frequency response H ($f$).

Antipodal splitting offers additional advantages such as circuit implementation for broadband operation and impedance matching. Ideally, the two frequency response of the two tandem devices should be identical, in which case by proper biasing of the devices the third order intermodulation distortion can be made to vanish. A mathematical analysis of tandem device operation over a frequency range in terms of the impact of the voltage to lightwave frequency responses of the two tandem devices on the total intermodulation distortion shows that any difference in those two frequency responses, henceforth to be called frequency response imbalance, generates excess nonlinear intermodulation distortion. This may be understood by the following argument considering a dual tandem device displaying equal frequency responses from each of the two splitter arms to the lightwave signals (FIG. 14a). Using block diagram manipulation techniques of linear systems, this is equivalent to factoring out the frequency response block ahead of the splitter (FIG. 14b) which yields a system with perfect third order cancellation, as the output of the common frequency response block can now be considered as a new effective input to an ideal tandem device. This consideration shows that dual tandem devices can operate well with arbitrary frequency responses, as long as the equal frequency responses affect both stages. This presents a very important advantage of the tandem schemes described in this disclosure vs. other tandem schemes described in prior art, e.g. M. L. Farwell and W. S. C. Chang, a directional coupler modulator with improved linearity, *Broadband Analog and Digital Optoelectronics*, Santa Barbara, LEOS 1992, which are adversely affected by frequency response effects. In those devices a single modulating voltage is applied to one of the several tandem stages resulting in a degradation of the linearization at higher frequencies as the velocity mismatch between the optical and electrical waves degrades the frequency response. In contrast, our device linearization operation is totally unaffected by the velocity mismatch mechanism which is the main degrading mechanism of modulator frequency response at high frequencies.

The embodiment of the antipodal splitter taught in this invention further reduces the frequency response imbalance in addition to optimizing the drive voltage and the static fifth order distortion. Thus the antipodal splitter yields a lower third and fifth order distortion over a broader frequency range.

Ease of realization is another advantage of the antipodal splitter is in terms of implementation. It is possible to realize antipodal splits using structures based on simple transmission line transformers as described below. Transmission line transformers have good broadband properties and naturally yield balanced in-phase or anti-phase splits.

The broad frequency range precludes the usage of transformers with windings. Rather, transmission line transformers have to be used. But such transformers yield splitting ratios which are equal in magnitude and either in phase or in anti-phase. To achieve unequal imbalanced drives (e.g. as required in Ref. Skeie and Johnson), a pad (an attenuator) could be inserted in the splitter output arm where the signal is too high. Such pad of course also required to be broadband, but the parasitics of the pad will generally affect the frequency response of the arm in which the pad is inserted. The need for additional tuning of the pad defeats the purpose of achieving the linearization optically rather than by complicated compensation of the electronic driver. In contrast, once the requirement for antipodal drives is specified, a transmission line transformer generates the desired antipodal signals with good frequency match over a broad range.

Another benefit of embodying the antipodal RF splitter by means of transmission line transformers is realized upon considering that the typical modulator travelling wave transmission line characteristic impedances are 25Ω with recent results in modulator design achieving 50Ω line impedances. These two values naturally appear in certain transmission line transformer splitting structures driven by amplifiers with conventional 50Ω loads.

Preferred Embodiment

With reference to FIG. 15, a broadband optical transmitter is based on a linearized Double BBI cascaded dual tandem optical modulator formed on an electro-optic material substrate such as LiNbO$_3$ by depositing optical waveguide patterns comprising a YJ-IF-DC first stage 61 coupled to a DC-IF-DC second stage 63. Both are BBI stages but the DC with input ports 91 and output ports 93 is common to both. The YJ 65 has an input waveguide 67 receiving light from CW laser 69. YJ output guides 71 and 73 are spaced at appropriate distances to make them optically decoupled for forming an IF section 75. A first IF electrode 77 applies a bias voltage $V_{IF1}$ to the IF section via the electrode 77, with the ground reference provided by electrode 84. A leg of a radio frequency modulating signal comes from RF splitter 80, which may be a transformer, via transmission line 79 to electrode 81 which is the center electrode of a three electrode coplanar travelling wave transmission line formed by electrode 81 together with the ground electrodes 85,87. A load resistor 83 is provided to terminate the transmission line. The electric fields in the gaps between electrode 81 and the ground electrodes modulate the IF waveguides phase retardation by means of the electro-optic effect. A DC output section 91,93 is butt-coupled to the two IF sections 75 and 95 of the two stages. A coupler electrode 95 feeds a coupler voltage, $V_{C1}$, to the first coupler. Selection of appropriate voltages for optimal tuning is discussed below. The second BBI stage 63 is similar in construction to the first. A second bias IF electrode 97, referred to ground electrode 104 applies a bias voltage $V_{IF2}$ to the IF section via the electrode 97. A second leg 99 of the RF modulating signal comes from RF splitter 80, with the two leg voltages being balanced i.e. of equal amplitudes and the second leg being either in phase or out of phase by 180 degrees with the first leg. In the in-phase case bias voltages $V_{IF1}$, $V_{IF2}$ should be applied such as to bias the devices on opposite slopes of the L-V characteristic, whereas in the anti-phase case the IFs should be biased on slopes of the same sign.

The RF signal is applied via transmission line 99 to electrode 101, the center electrode of the coplanar travelling wave transmission line formed by electrode 101 together with the ground electrodes 105,107 and terminated by a load resistor. A DC output section 111, 117 has an associated coupler electrode 115 feeding a second coupler bias voltage, $V_{C2}$. A pair of output waveguides 117 and 119 deliver modulated output signals $P_{O1}$ and $P_{O2}$. The two bias voltages applied to the coupler electrodes 95 and 115, namely $V_{C1}$ and $V_{C2}$ and the bias voltages applied to the interferometer bias electrodes 81 and 101, namely $V_{IF1}$ and $V_{IF2}$, are generated by parametric feedback controller 121. A fiber optic splitter 123 taps a fraction of one of the optical signals and feeds it to an optical receiver 125 which photodetects the optical signal and feeds a proportional electrical signal to be analyzed for the presence intermodulation distortion products by the controller 121 which will be described further below. The intermodulation products are derived from at least one pilot tone generated by the controller 121 at output 130 and injected into the a summing node 127 wherein the pilot tones are combined with the signal input voltage 129 and applied to splitter 80. Another possibility is to inject each of two pilot tones generated by the controller into each of the IF sections, either by summing each of those tones by means of bias tees into the output legs 79, 99 of the splitter 80, or preferably summing each of these pilot tones together with the bias control voltages $V_{IF1}$ (131) and $V_{IF2}$ (135) into the IF bias electrodes 77 and 97. The controller 121 monitors second order intermodulation products of the applied pilot tones as detected at the output of receiver 125 and generates the bias voltages $V_{IF1}$ and $V_{IF2}$ so as to substantially null those intermodulation products, according to the principle of operation of parametric control loops as described in the co-pending patent application "*Optical transmitters linearized by parametric feedback*" Ser. No. 07/378,328. Similarly, the controller 121 can monitor third second order intermodulation products of the applied pilot tones as detected at the output of receiver 125 closed loop control at least one of the two bias voltages $V_{C1}$(133) and $V_{C2}$(137) so that to substantially null the third order intermodulation distortions.

Electrical splitter implementation

The realization of the balanced broadband electrical splitter 80 has one electrical input for the modulating signal and two RF outputs driving the two IF sections, such that the modulating signals generated are antipodal, namely they are either in-phase and are equal in magnitude over as broad a frequency range as accurately as possible. In a typical implementation for the current CATV systems the frequency range would be 50 to 550 MHz. Future CATV systems would require an upper frequency range in excess of 1 GHz.

Figure 16:
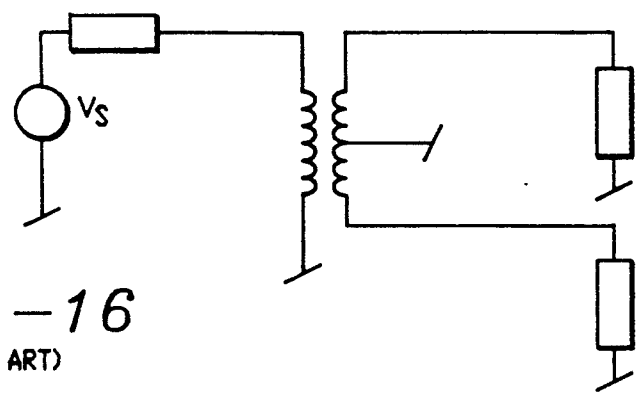
FIG. 16 shows a limited bandwidth dual tandem electrical splitter driver realized as a balun transformer with windings on ferrite toroid.

A classical narrowband realization of a splitter is as a balun transformer with windings on a ferrite toroid, as shown in FIG. 16. This would have a limited bandwidth of the order of octaves at most and would therefore not be suitable for broadband applications. The limited bandwidth of the transformer is due to the parasitic inductances and capacitances of the winding in FIG. 16.

The preferred embodiments for balanced splitters with widest bandwidth and best match between the frequency responses of the two arms are transmission line structures such as baluns and hybrids. Transmission lines with characteristic impedances matching the source and load resistors ensure broad bandwidth, good impedance match, and low loss. Parasitics are minimized because voltage and current ratios are based on combinations of cable impedances rather than numbers of turns. The bandwidth limitations of transmission line transformers come from parasitic shored transmission lines introduced when one end of a cable is grounded. The effect of these lines is minimized by sheathing the coaxial cables in ferrite.

Figure 17A:
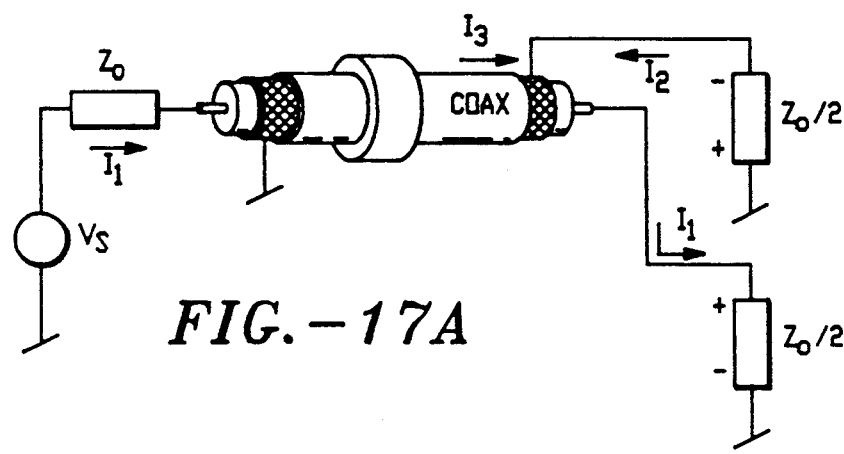
FIG. 17a shows a partial balun structure intended as a first attempt at the realization of a broadband balanced splitter.
Figure 17B:
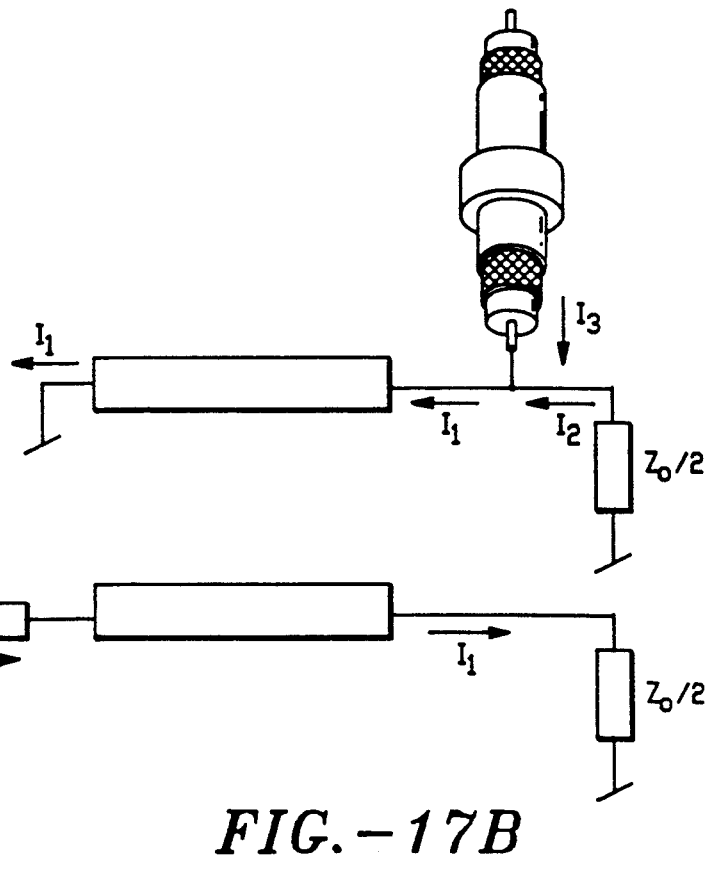
FIG. 17b depicts an electrical model of the structure of FIG. 17a with the coaxial cable modeled as coupled transmission lines and a shorted stub to ground leading to an asymmetry which reduces the balance of the balun.
Figure 18:
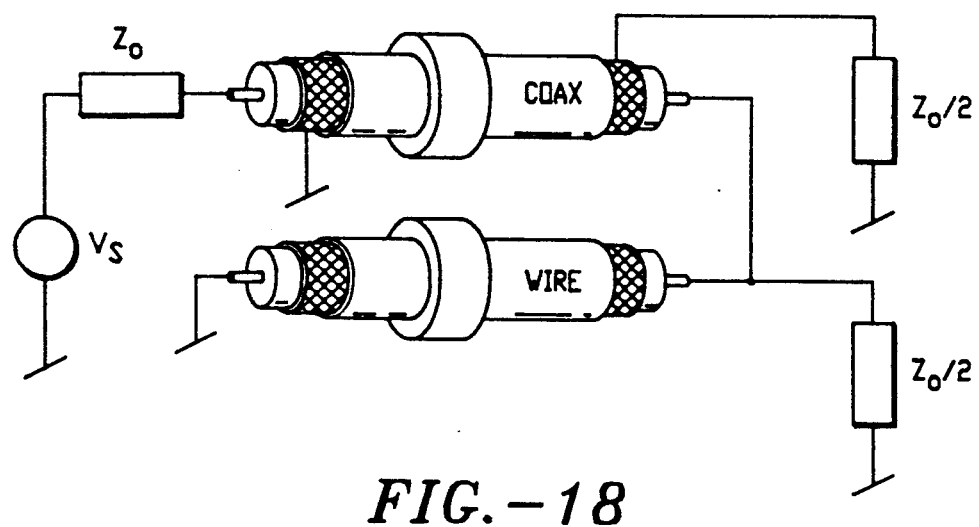
FIG. 18 shows a final transmission line transformer splitting structure which is well balanced at all frequencies and provides decades of bandwidth and low loss. The structure includes a compensating wire of diameter equal to the coax and a similar piece of ferrite as that which surrounds the coax connected to the inner conductor which balanced the structure with respect to as the outside of the shield.
Figure 19:
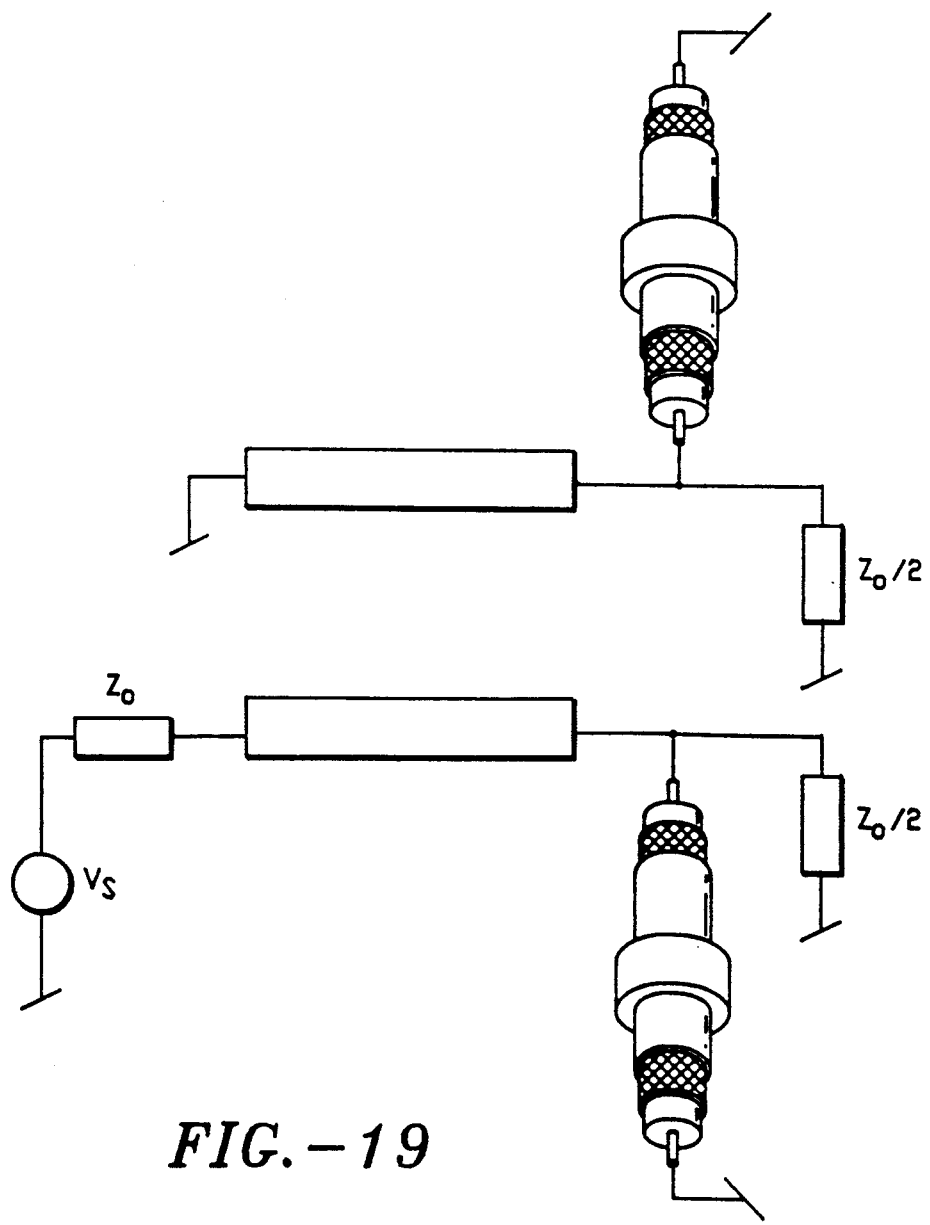
FIG. 19 shows the equivalent model of the balanced structure of FIG. 17.

The parasitic lines result from currents on the outside of the coax whose effect can be understood from FIG. 17a which shows a partial balun with currents and voltages, the voltages have signs corresponding to the input signal and assume no delay through the coax. An electrical model of the structure is depicted in FIG. 17b. The coaxial cable can be modeled as coupled transmission lines and a shorted stub to ground. Currents and voltages between the inner conductor and the inside of the shield are effectively isolated from ground. This creates a coupled pair of lines with infinite even mode impedance. The outside of the coax does have an impedance with respect to ground. The outside of the coax forms a shorted stub which uses the ferrite as part of its dielectric. As shown in FIG. 17b, this leads to an asymmetry through current $I_3$, which reduces the balance of the balun. Therefore a wire must be added to the inner conductor which has the same as the outside of the shield. This may be done with a wire of diameter equal to the coax and a similar piece of ferrite as that which surrounds the coax. The final structure (FIG. 17) is well balanced at all frequencies and provides decades of bandwidth, and low loss. The electrical model of this compensated balun is shown in FIG. 19.

Figure 20:
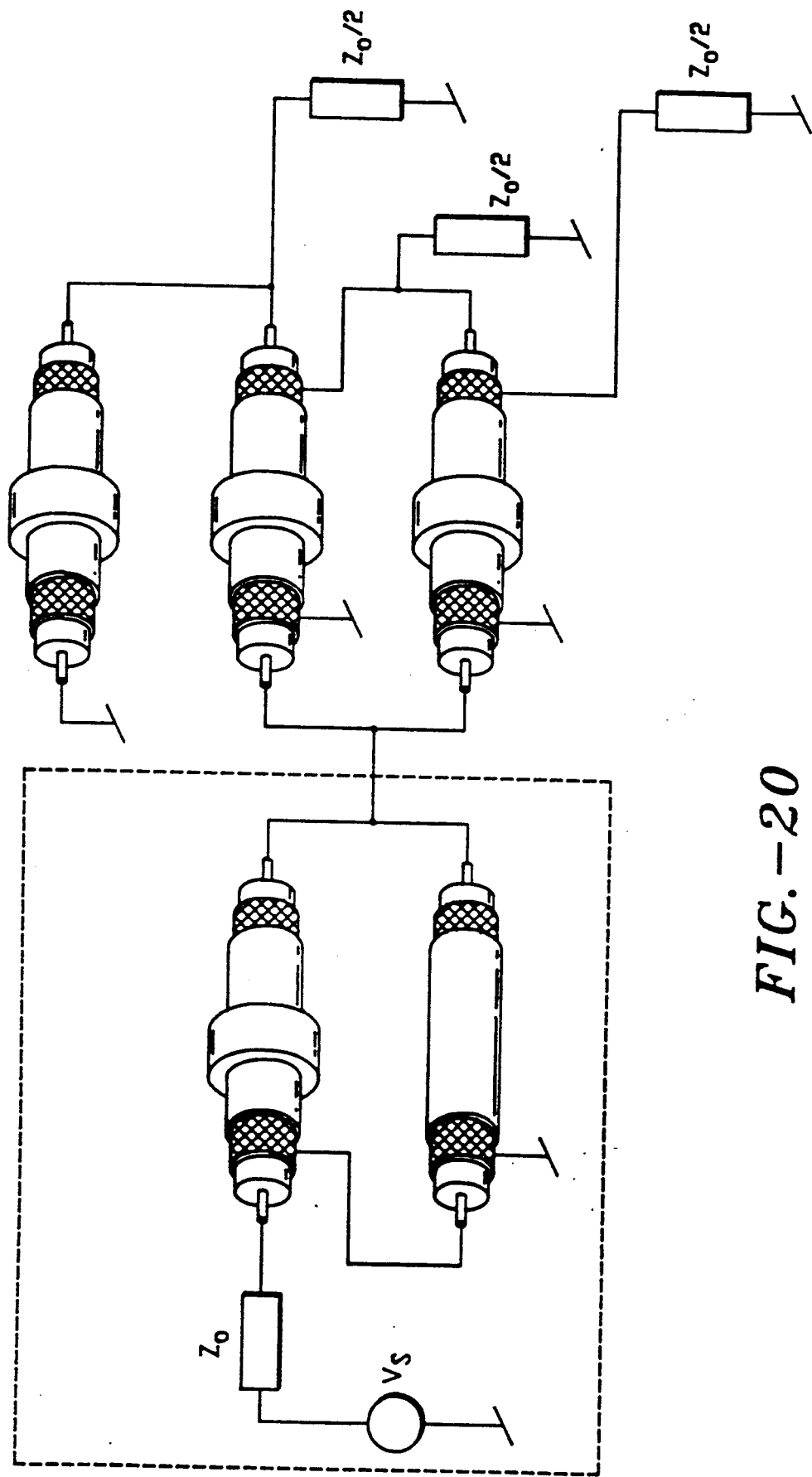
FIG. 20 depicts a broadband transmission line hybrid antipodal splitter with improved load isolation used to drive the two stages of the dual tandem devices.

Additional critical parameters of these transformers are isolation between loads and signal balance at the outputs. The isolation between the output ports depends primarily on the source impedance match. This is because any reflection from one of the loads would create a signal back into the source impedance. This signal would be terminated if the source is 50 ohms and partially reflected if the source is not 50 ohms. The secondary reflection would be equally split between the loads and be seen as less than perfect isolation. The transmission line hybrid shown in FIG. 20 embodies an antipodal splitter with improved load isolation. In addition, it provides decades of bandwidth with higher loss, and the isolation depends on the balance between the matching resistor and the transformer output impedance. The output signals of such a transmission line transformer are balanced in magnitude and are antiphase. Similar structures can be realized to achieve in-phase splitting as well.

Optimal fabrication

In the preferred embodiment the two DCs are symmetrically fabricated yielding $\delta=0$ (i.e. the waveguides are nominally made identical, except for fabrication imperfections). The fabrication parameters, (e.g. waveguides dimension and the dopant concentration) are chosen so as to make the $\kappa$ parameters correspond to values of the $\Gamma_1$, $\Gamma_2$ parameters in the vicinity of the optimal values $$\Gamma_1^{opt}=0.81201 \quad \Gamma_2^{opt}=0.11637 \tag{24}$$

These optimal values were obtained in the course of the disclosed optimization analysis, the objective of which was to null the third order power series coefficient of the transfer characteristic while simultaneously both maximizing the first order (linear modulation) coefficient and minimizing the fifth order normalized distortion:

$$d_3(\Gamma_1^{opt},\Gamma_2^{opt}) \to 0 \quad d_1(\Gamma_1^{opt},\Gamma_2^{opt}) \to \text{Max}$$
$$d_5^{norm}(\Gamma_1^{opt},\Gamma_2^{opt}) \to \text{Min} \tag{25}$$

As was proven, the optimization of linear slope and fifth order coefficients occur simultaneously, so in the sequel we only mention the maximization of $d_1$, with the understanding that the minimization of $d_5$ is implied once $d_1$ is maximized.

To account for process imperfections it is necessary to apply final fine tuning by means of bias voltages $V_{c1}$, $V_{c2}$ exerted on at least one of the two couplers. Couplers tuning is attained by means of either the $\Delta\beta$ effect and/or by the $\Delta\delta$ effect.

$$\left. \begin{array}{l} \Gamma_1(V_{c1}) = \Gamma_1(\kappa(V_{c1}),\delta(V_{c1})) \\ \Gamma_2(V_{c2}) = \Gamma_2(\kappa(V_{c2}),\delta(V_{c2})) \end{array} \right\} \tag{26}$$

The most practical tuning means requiring minimal voltages are those involving predominantly $\Delta\beta$ tuning, as disclosed in this invention. Consequently, as is widely known, the proper crystal cut and electrode placing should be chosen in the preferred embodiment to implement $\Delta\beta$ couplers.

The objective of the fine tuning is to null out the third order Taylor series coefficient of the transfer characteristic, but unless a full two-degrees of freedom search in the $V_{c1}$, $V_{c2}$ plane is performed in an attempt to locate their optimal values, the objective of maximization of the linear slope is slightly compromised, i.e. the resulting linear slope is going to generally end up not at its peak value, but close to it. In mathematical terms, there exist solutions such that $d_3=0$ which do not necessarily maximize $d_1$, however in the vicinity of the optimal solution there exist quasi-optimal solution such that $d_3=0$ but $d_1$ is almost maximized.

The actual process of tuning the coupler voltages could be performed either open loop or closed loop. In the open loop case (which is actually a closed loop through a human operator), the bias voltages adjustment procedure starts by applying a multitone RF signal to the splitter, and monitoring in the optical output (after electrical detection by means of a photoreceiver 125) third order intermodulation products of some or all of the RF tones (henceforth called test beats). In the process, one of the coupler voltages, say $V_{C1}$ is initially set to zero, and $V_{C2}$ is manually adjusted to minimize the detected test beat. The level of one of the fundamental tones (henceforth called test fundamental) is also recorded. Then as $V_{C1}$ is progressively set to various values, $V_{C2}$ is set to minimize the level of the test beat. $V_{C1}^{opt}$ is the level of $V_{C1}$ which maximizes the test fundamental and the optimal value $V_{C2}^{opt}$ for $V_{C2}$ is that which minimizes the test beat once $V_{C1}^{opt}$ is chosen. In other embodiments at least one of the couplers is passively fabricated as close as possible to its optimal value as to minimize the test beat.

A second set of tuning voltages $V_{IF1}$, $V_{IF2}$ are applied to the interferometer sections. These voltages are intended to counteract undesired distortion in the transfer characteristic due to $\Delta\beta$ tuning of the couplers. Even if fortuitously the optimal values were achieved with $\Delta\beta=0$ setting of the couplers, it would still be necessary to apply tuning voltages to the interferometer sections to null out the even order distortion since random and time-varying phase biases can be generated in the interferometers as is well known. When $\Delta\beta$ tuning is used, interferometer tuning voltages have the additional purpose of counteracting even-order distortions induced by variations of $\Delta\beta$.

In the preferred embodiment, separate lumped electrodes (77 and 97 in FIG. 15) are used to apply these bias voltages. As an alternative, "bias tee" circuits combining RF and DE bias voltages and applying them to the RF electrodes, can be used. In the preferred embodiment travelling wave electrodes, e.g. coplanar structures, are used to apply the RF modulating voltages, as shown in FIG. 15, however the principles of this invention equally apply to lumped electrode structures.

We have seen that the coupler voltages could really be adjusted independently. In other words, for every setting of one of the coupler voltages, say $V_{C1}$, there exists a setting of the other coupler voltage $V_{C2}$ such that $d_3=0$. A similar degree of freedom does not apply to the tuning of even order bias voltages by means of the bias voltages to the IF sections. Both of these voltages need to be simultaneously tuned to specific values in order to cancel all even order distortions. Thus, the tuning of the IF bias voltages to the optimal values is a simultaneous two-degrees of freedom endeavor. The preferred method to tune the IF bias voltages is then solely by means of parametric closed loop feedback controller (121 in FIG. 14). A similar method could be applied for closed loop tuning of the coupler voltages. These method are similar to those taught in co-pending patent application "Optical transmitters linearized by parametric feedback" Ser. No. 07/378,328. Pilot tones (130) generated by the controller are injected to the IF sections (either in the bias or the RF electrodes) and the generated second order intermodulation products (pilot beats) are monitored by the controller 121 via the optical receiver 125. The feedback loop works by feeding back quasi-DC bias voltages proportional to the beat signals until these pilot beats vanish.

Mathematical Derivation Of Transfer Characteristics

In this section we derive the device transfer characteristics and their power series representations as a function of the various device parameters and applied bias voltages. The mathematical results derived here are the basis for the embodiments described above. Next section takes up the optimization of the transfer characteristics.

The general form of the L-V transfer characteristic is given by Eq. 1. Each of the disclosed devices correspond to one of two types of mathematically generic L-V characteristics depending on whether a single waveguide or two waveguides connect the two sections. The dual tandem devices disclosed in this invention are driven simultaneously by linearly scaled versions of a single (normalized) input voltage $\phi$ $$\phi_1=r_1\phi \quad \phi_2=r_2\phi \tag{27}$$

applied to the modulating electrodes of the two stages. The generic transfer characteristic $$P(\phi)=\bar{P}I(r_1\phi+\eta_1, r_2\phi+\eta_2) \tag{28}$$

is expressed as a function of a single variable $\phi$ which is the normalized input voltage to the splitter; $\eta_1$, $\eta_2$ are bias phases related to the applied bias voltages on the modulating electrodes of the two stages.

Type I: single waveguide connecting the two sections: DMZ, MZBBI, split tandem devices In most general terms let the transfer characteristics of the two sections be $$\left.\begin{array}{l}P_{o1} = P_{i1}Q_1(v_1) \\ P_{o2} = P_{i2}Q_2(v_2)\end{array}\right\} \tag{29}$$

Since a single optical waveguide connects the two sections $$P_{i2}=P_{o1} \tag{30}$$

yielding $$I_{o2}(\phi)=I_1(\phi)I_2(\phi) \tag{31}$$

i.e. type-I characteristics essentially multiply upon tandem cascading.

Therefore the DMZ and MZBBI devices have an L-V characteristics given by $$P(\phi_1, \phi_2)=\bar{P}[1\pm a_1 \sin(\phi_1)][1\pm a_2 \sin(\phi_2)] \tag{32}$$

where the average optical power is given by $$\bar{P} = \frac{P_{in}}{2\Lambda} \tag{33}$$

with $P_{in}$ the input optical power, $\Lambda$ is the excess loss through the device (expressed on a linear scale), the factor of $\frac{1}{4}$ is contributed by two factors of 0.5, one for each section, and $a_1$, $a_2$ are coefficients determining the extinction ratio (ratio of the maximum optical power obtained for the plus sign to the minimum power obtained for the minus sign). The extinction ratio is a function of the ideality of the Y-junctions and the setting of the coupler cross-over ratio. Infinite extinction ratios, corresponding to $a_1=1=a_2$ are obtained for 50%/50% YJ and coupler settings.

Type II: Two waveguide ports connecting the two sections: DBBI and BBIMZ devices In this case corresponding to the DBBI and BBIMZ devices, the characteristics of the two stages do not simply multiply since the two inputs to the second section are coherent. The analysis is to be performed in terms of transfer matrices.

The BBIMZ case can be treated as a special case of the DBBI case having the same transfer characteristic as the upper port of an equivalent DBBI device with a second 50%/50% coupler, therefore we only consider the DBBI device further.

Using Eq. 12 with the input field vector given by equal amplitudes normalized to unity corresponding to the output of the first Y-junction, $$\begin{bmatrix} E_1 \\ E_2 \end{bmatrix} = \begin{bmatrix} 1 \\ 1 \end{bmatrix} \quad (34)$$

one computes the normalized output intensity at the upper output as the squared modulus of the electric field $$I = E_1 (E_1)^* \quad (35)$$

using the elements of the transfer matrix M. By virtue of the unitarity of the M matrix (conservation of energy) the intensity at the lower output is complementary being given by $2-I$, i.e. it suffices to treat the upper output.

The transfer matrix for DBBI device is given by a matrix product corresponding to a cascade of IF and DC matrices.

$$M = C[\kappa_2, \delta_2] F[\phi_2 + \eta_2] C[\kappa_1, \delta_1] F[\phi_1 + \eta_1] \quad (36)$$

which reduces to $$M = C[\kappa_2, 0] F[\phi_2] C[\kappa_1, 0] F[\phi_1] \quad (37)$$

for the special case of symmetric couplers $\delta_1 = 0 = \delta_2$ and no IF biases, $\eta_1 = 0 = \eta_2$. Applying the matrix (Eq. 37) onto the vector (Eq. 34) according to Eq. 12 yields $$E_1 = -K_1 K_2 e^{j(\phi_1 - \phi_2)/2} + j\hat{K}_1 K_2 e^{j(-\phi_1 - \phi_2)/2} + jK_1 \hat{K}_2 e^{j(-\phi_1 - \phi_2)/2} + \hat{K}_1 \hat{K}_2 e^{j(\phi_1 + \phi_2)/2} \quad (38)$$

Physical insight into this expression can be obtained by following the four possible paths to reach the upper output port through the upper and lower waveguides of the IF sections of the two stages of the DBBI modulator.

Symmetric $\Delta\kappa$ couplers and no IF biases

Applying Eq. 35 to find the squared modulus of the last equation yields $$I(\Phi_1, \Phi_2) = 1 + f_1 \sin(\Phi_1) + f_\Delta \sin(\Phi_1 + \Phi_2) - f_2 \sin(\Phi_1 - \Phi_2) \quad (39)$$

therefore $$P(\Phi_1, \Phi_2) = \overline{P} I(\Phi_1, \Phi_2) \quad (40)$$

with $$\overline{P} = \frac{P_{in}}{2\Lambda} \quad (41)$$

wherein the coefficients $f_1, f_\Delta, f_2$ depend on the coupling ratios or angles $\gamma_1, \gamma_2$ of the two couplers:

$$\left. \begin{array}{l} f_1 = \sin(2\gamma_1)\cos(2\gamma_2) \\ f_\Delta = \sin(2\gamma_2)\cos^2(\gamma_1) \\ f_2 = \sin(2\gamma_2)\sin^2(\gamma_1) \end{array} \right\} \quad (42)$$

In the antipodal spliting case $$\Phi_1 = \Phi \quad \Phi_2 = -\Phi \quad (43)$$

the transfer characteristic further reduces to:

$$I(\Phi) = 1 + f_1 \sin(\Phi) - f_2 \sin(2\Phi) \quad (44)$$

Asymmetric and $\Delta\beta$ couplers transfer characteristic

The mathematical derivation of the L-V characteristic taken up in this subsection establishes why a $\Delta\beta$ coupler cannot be trivially combined with the work of Ref. Skeie and Johnson. It is shown that substituting a $\Delta\beta$ coupler for the $\Delta\kappa$ couplers taught there would yield considerable nonlinear distortion of even order.

The parameter $\gamma$ of the asymmetric coupler depends on both the applied voltage ($\delta$) and the coupling coefficient $\kappa$ rather than on $\kappa$ alone (Eq. 15). The magnitudes of the coupling coefficients are now given by expressions analogous to the case of the symmetric coupler, with $\Gamma \longleftrightarrow \gamma$ i.e. the coupling parameter $\Gamma$ of the asymmetric coupler (Eq. 16) plays the role of the coupling angle $\gamma$ for the symmetric coupler. However, because of the presence of the phaseshifts $\pm\Delta$ the diagonal matrix elements of $C[\kappa, \delta]$ are no longer real. For the antipodal drives case (Eq. 43), which is of most interest as being the optimum splitting ratio, the transfer matrix is $$M = C[\kappa_2, \delta_2] F[-(\phi + \eta_2)] C[\kappa_1, \delta_1] F[\phi + \eta_1] \quad (45)$$

Performing the matrix multiplication indicated in Eq. 12 now yields $$E_1 = \hat{K}_1 \hat{K}_2 e^{j\alpha_1} + j\hat{K}_1 K_2 e^{j\alpha_2} - K_1 \hat{K}_2 e^{j\phi} e^{j\alpha_3} + jK_1 K_2 e^{-j\phi} e^{j\alpha_4} \quad (46)$$

with $$\left. \begin{array}{l} \alpha_1 = \eta_1/2 + \Delta_1 - \eta_2/2 + \Delta_2 \quad \alpha_2 = -\eta_1/2 - \Delta_1 + \eta_2/2 \\ \alpha_3 = \eta_1/2 + \eta_2/2 \quad \alpha_4 = -\eta_1/2 - \eta_2/2 + \Delta_2 \end{array} \right\} \quad (47)$$

leading to the final results $$I = I_0 + f_2 \sin(2\phi') + f'_{1c} \cos(\phi') - f'_{1s} \sin(2\phi') \quad (48)$$

with $$I_0 = 1 + (G_2^2 - 1) \cos^2(\Gamma_1) \quad \phi' = \phi + \Delta\phi \quad (49)$$

$$G_2 e^{j\Gamma''_2} = \cos(\Gamma_2) e^{j\alpha_1} + \sin(\Gamma_2) e^{j\alpha_2} \quad (50)$$

$$f'_{1s} = G_2 \sin(2\Gamma_1) \cos(\Gamma'_2 + \Gamma_2) \quad f'_{1c} = G_2 \sin(2\Gamma_1) \sin(\Gamma'_2 - \Gamma_2) \quad (51)$$

It is apparent that even order cosine terms appear in the transfer characteristic, therefore the $\Delta\beta$ couplers do not appear to be directly usable, even though they are the most convenient way of tuning the device to the optimum odd order characteristics. The following analysis establishes that these even order distortions can be biased away by a combination of interferometer biases as mentioned in the best mode section.

Tuning of asymmetric and $\Delta\beta$ couplers.

It is the phaseshifts $\pm\Delta$ of the diagonal terms of the coupler transfer matrices that lead to even symmetry cosine terms. The investigation disclosed in this application has established that it is possible to compensate for the phase shifts $\pm\Delta$ by applying static bias voltages $\eta_1$, $\eta_2$ to the electrodes of the two interferometer sections. Under the prescribed interferometer biasing voltages, the transfer characteristic is reduced to that of symmetric couplers.

This result is far from trivial. Since the intent is to counteract phaseshifts in each of the couplers, it might seem that it might be achieved by applying opposite phaseshifts in each of the interferometer regions corresponding to each of the couplers. However, the results derived below show that the tuning voltage applied to the second IF section depends on both couplers, indicating a more complex situation.

Examining Eq. 46 it is apparent that this expression differs from the case where $\Delta\beta=0$ (Eq. 38) by the presence of the phase factors $\alpha_i$. The key to reducing the current case to the case $\Delta\beta=0$ is requiring that all these phase factors be equal:

$$\alpha_1=\alpha_2=\alpha_3=\alpha_4 \qquad (52)$$

Under such constraint the common phase factor can be factored out of Eq. 46 and discarded since a phase factor has no impact on the output intensity. Thus, if the device can be biased such that the condition (Eq. 52) holds, the analysis is reduced to that of the symmetric coupler case. Solving Eq. 47 under the constraint Eq. 52 yields the condition $$\eta_1=-\Delta_1 \quad \eta_2=\Delta_1+\Delta_2 \qquad (53)$$

Thus, by application of interferometer tuning voltages as given by the last equation a null for the third order is attainable without paying the penalty of even order distortion. Once the appropriate even order IF biases are applied, the mathematical optimization results disclosed for the symmetric couplers case all hold provided $\gamma\rightarrow\Gamma$. In particular tuning of the couplers for null third order distortion, for minimum normalized fifth order distortion and for maximum linear modulation coefficient is possible, and in fact is facilitated by the usage of $\Delta\beta$ couplers which are more readily tunable than the $\Delta\kappa$ symmetric couplers. It is apparent that due to the coupling of interferometer bias voltages implied by Eq. 53 and the dependence of the $\Delta$ phaseshifts on the coupler tuning voltages which may affect both $\delta$ and $\kappa$ (Eq. 17, Eq. 14), all control voltages are interrelated, calling for the tuning procedures and the usage of parametric control loops which we disclose here similar to the ones discussed in our co-pending patent application "Optical transmitter linearized by parametric feedback" Ser. No. 07/378,328.

These bias means are used in order to apply $\eta_1$, $\eta_2$ bias voltages to the interferometer sections in order to null out the second order distortions, while at the same time control voltages are applied to the tunable $\Delta\beta$-couplers in order to null out the third order distortions. Such control loops work by injection pilot tones (FIG. 15) to the electrical inputs and monitoring the second order intermodulation distortions of these pilot tones in the optical outputs, then feeding back voltages to the couplers in such as way that the negative feedback action results in the correct bias voltages for those intermodulation products to vanish.

What we are disclosing here then is $\Delta\beta$ tuning of the couplers in the DBBI and BBIMZ devices to the point of null third order distortion, while simultaneously correcting for second order distortions generated in the process of $\Delta\beta$ tuning by applying bias voltages on the two interferometer sections in order to tune away the second order distortions. The voltages on the interferometers are applied by means of a parametric closed loop system which nulls the distortion products in the optical output associated with electrical pilot tones injected in the input.

Optimization Of Type I Transfer Characteristics

We here derive optimum solutions for the type I transfer characteristic. In accordance to the teachings of this invention the most efficient type of splitting ratio for driving the two section electrodes is the antipodal split (Eq. 42) which when applied upon Eq. 32 in conjunction with some arbitrary additive phase biases $\eta_1$ and $\eta_2$ yields $$I(\phi)=[1+a_1\sin(\phi+\eta_1)][1=a_2\sin(-\phi+\eta_2)] \qquad (54)$$

The last equation is developed into a power series and a system of three equations is set up, corresponding to nulling the second, third and fourth Taylor series coefficients. Since there are four parameters and only three equations, $a_1$ is arbitrarily set to unity corresponding to an infinite extinction ratio in the first stage. Solving the system with respect to the remaining three parameters yeilds:

$$\eta_1=0.226681 \quad \eta_2=-1.34412 \quad a_1=1 a_2=0.230645 \qquad (55)$$

The power series expansion of Eq. 54 with these parameters is $$I(\phi)=0.949+0.692\phi+1.145\times10^{-6}\phi^2-4.17\times10^{-7}\phi^{-3}-3.649\times10^{-7}\phi^4-0.023\phi^5 \qquad (56)$$

In fact, numerical expansion of the series to higher order indicates that all even coefficients are nulled, even though we only required the nulling of the second and fourth order coefficients in obtaining the parameters of the last equation. An example of linearized modulator devices which can implement this transfer function are shown in FIG. 6. The parameter $a_2$ (Eq. 55) determines the cross-over coefficient of the directional coupler. There is a 3 dB inherent optical loss for the type I devices shown in FIG. 8b and FIG. 8d because a MZ device is used in the first stage rather than a BBI device. It is possible to have type I devices with this 3 dB loss eliminated by introducing split tandem arrangements wherein each of the outputs of the first BBI stage are connected to a branch consisting of device with single input (FIG. 11).

Mathematical Optimization Of Type II Transfer Characteristics

The parameters over which the optimization is performed are the optical directional coupler cross-over coefficients $K_1$, $K_2$ (or alternatively the coupler angles $\gamma_1$, $\gamma_2$), and the electrical splitting ratio $\rho = r_1:r_2$. The optimization criteria are the minimization of the normalized fifth order coefficient and the maximization of the linear modulation coefficient under the constraint that the third order coefficient be nulled. In order to cancel the third order coefficient, the signs of $r_1$, $r_2$ have to be opposite, i.e. $r_1 r_2 < 0$. Two cases can be considered for the electrical splitting ratios, which correspond to deriving an imbalanced splitter by taking a balanced splitter and placing an attenuator with voltage attenuation $\rho < 1$ in either the splitter output arm connected to the first modulator stage or the splitter arm connected to the second modulator stage, the two cases being labelled $\rho:1$ and $1:\rho$, respectively.

With the splitter placed in the first output arm $$\phi_1 = -\rho\phi, \quad \phi_2 = \phi \tag{57}$$

and Eq. 39 yields $$I_{\rho:1}(\phi) = 1 - f_1 \sin(\rho\phi) + f_\Delta \sin((1-\rho)\phi) + f_2 \sin((1+\rho)\phi) \tag{58}$$

With the splitter placed in the second output arm $$\phi_1 = \phi, \quad \phi_2 = -\rho\phi \tag{59}$$

and Eq. 39 yields $$I_{1:\rho}(\phi) = 1 + f_1 \sin(\rho\phi) + f_\Delta \sin((1-\rho)\phi) - f_2 \sin((1+\rho)\phi) \tag{60}$$

Expanding these equations into a power series yields $$I_{\rho:1}(\phi) = 1 + d_1'\phi + d_3'\phi^3 + d_5'\phi^5 + \ldots \tag{61}$$

and $$I_{1:\rho}(\phi) = 1 + d_1''\phi + d_3''\phi^3 + d_5''\phi^5 + \ldots \tag{62}$$

with coefficients given by $$\begin{aligned} d_1' &= -f_1\rho + (1-\rho)f_\Delta + f_2(1+\rho) \\ d_3' &= \frac{1}{6}[-f_2(1+\rho)^3 - f_\Delta(1-\rho)^3 + f_1\rho^3] \\ d_5' &= \frac{1}{120}[-f_1\rho^5 + f_\Delta(1-\rho)^5 + f_2(1+\rho)^5] \end{aligned} \tag{63}$$

and $$\begin{aligned} d_1'' &= f_1 + (1-\rho)f_\Delta - f_2(1+\rho) \\ d_3'' &= \frac{1}{6}[f_2(1+\rho)^3 - f_\Delta(1-\rho)^3 - f_1] \\ d_5'' &= \frac{1}{120}[f_1 + f_\Delta(1-\rho)^5 - f_2(1+\rho)^5] \end{aligned} \tag{64}$$

It is apparent that the third order coefficient $d_3$ is a difference of terms and can be nulled by having the composing positive and negative terms balance out.

FIG. 22 through FIG. 25 describe the contour plots for the functions $d_1[K_2, \rho]$ and $d_5^{norm}[K_2, \rho]$ for the two cases $\rho:1$ and $1:\rho$. The tickmarks are in percent and the ranges for the axes are $K_2 \epsilon [0,1]$ and $\rho \epsilon [1,0]$. In the plots for $d_1$ higher values are brighter whereas in the plots for $d_5^{norm}$ lower values are brighter.

Figure 21A:
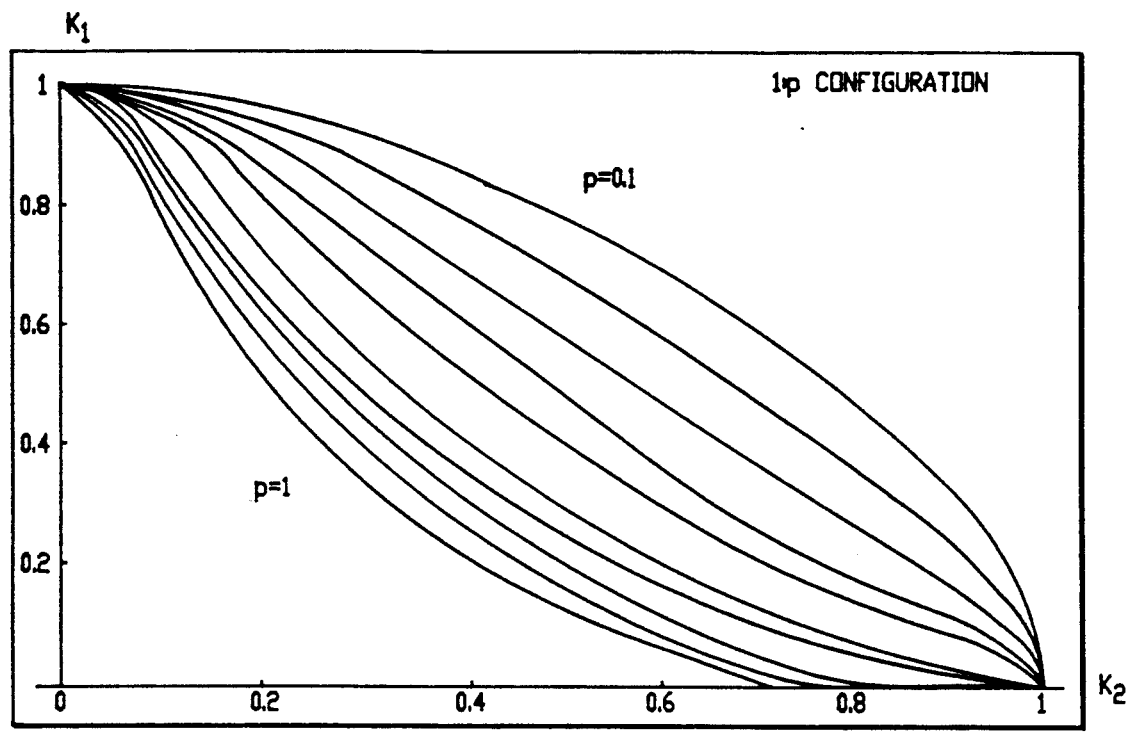
FIG. 21 depicts two contour plots in the $K_1$-$K_2$ plane, describing equi-lines of the splitting ratio $\rho$ such that $d_3=0$, i.e. loci of all possible pairs of coupler values yielding null third order distortion for each given splitting ratio $\rho$.
Figure 21B:
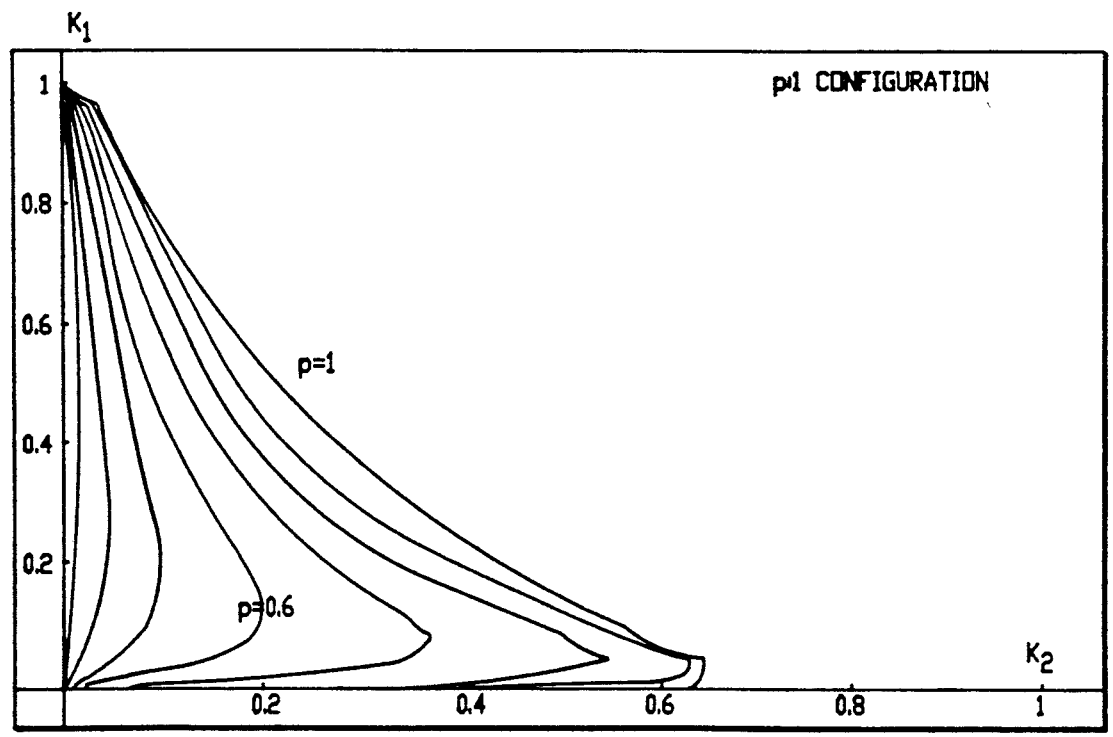
Figure 22:
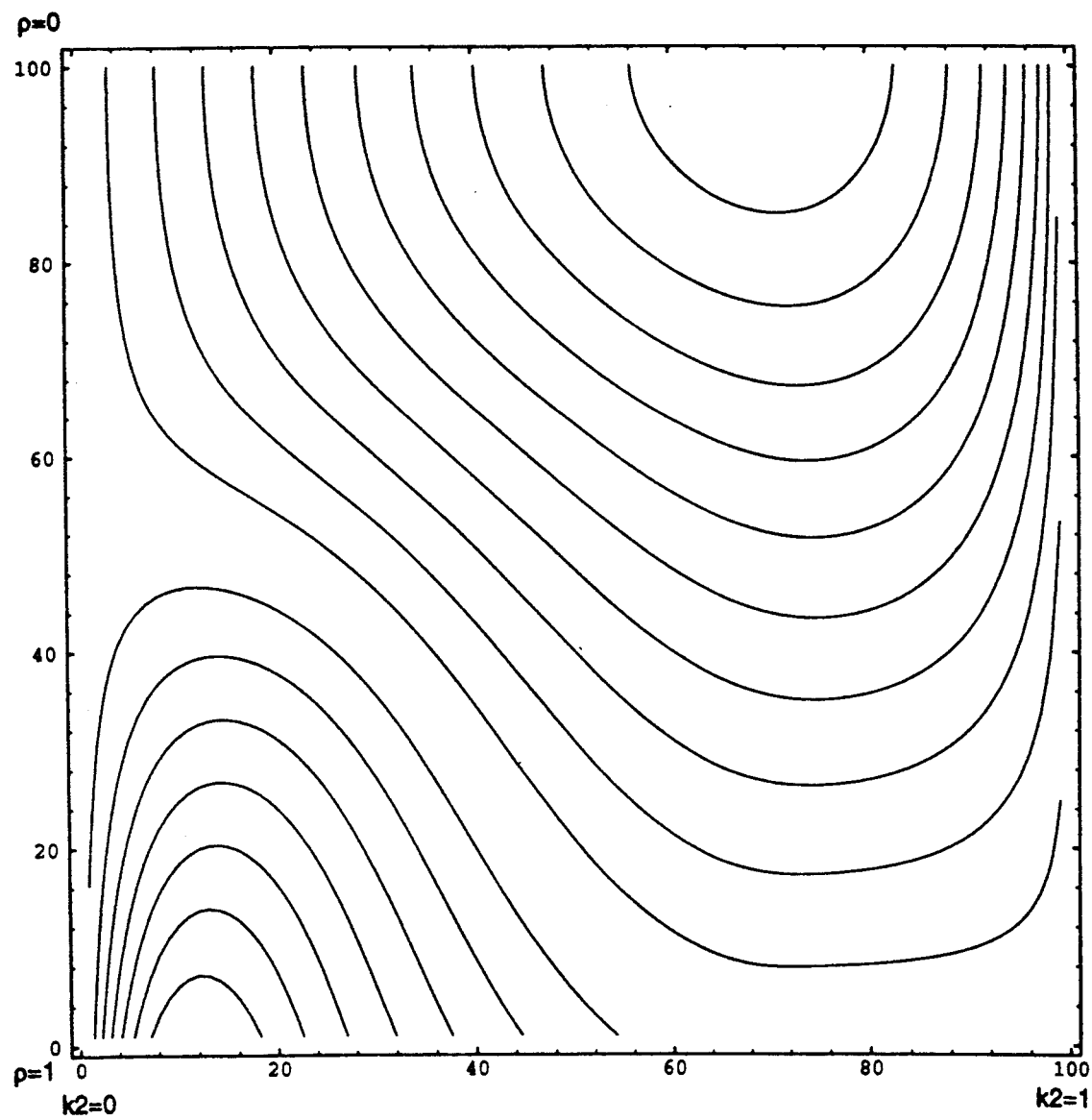
FIG. 22 through FIG. 26 depict contour plots in the $\rho-K_2$ plane for two of the quantities to be optimized: the first and fifth normalized power series coefficients $d_1$ and $d_5^{norm}$, while satisfying the constraint that the third order coefficient $d_3=0$ which predetermines the first coupler value $K_1$. The two independent variables $\rho$ and $K_2$ range from 0 to 1 as indicated and the tickmarks are in percent.
Figure 23:
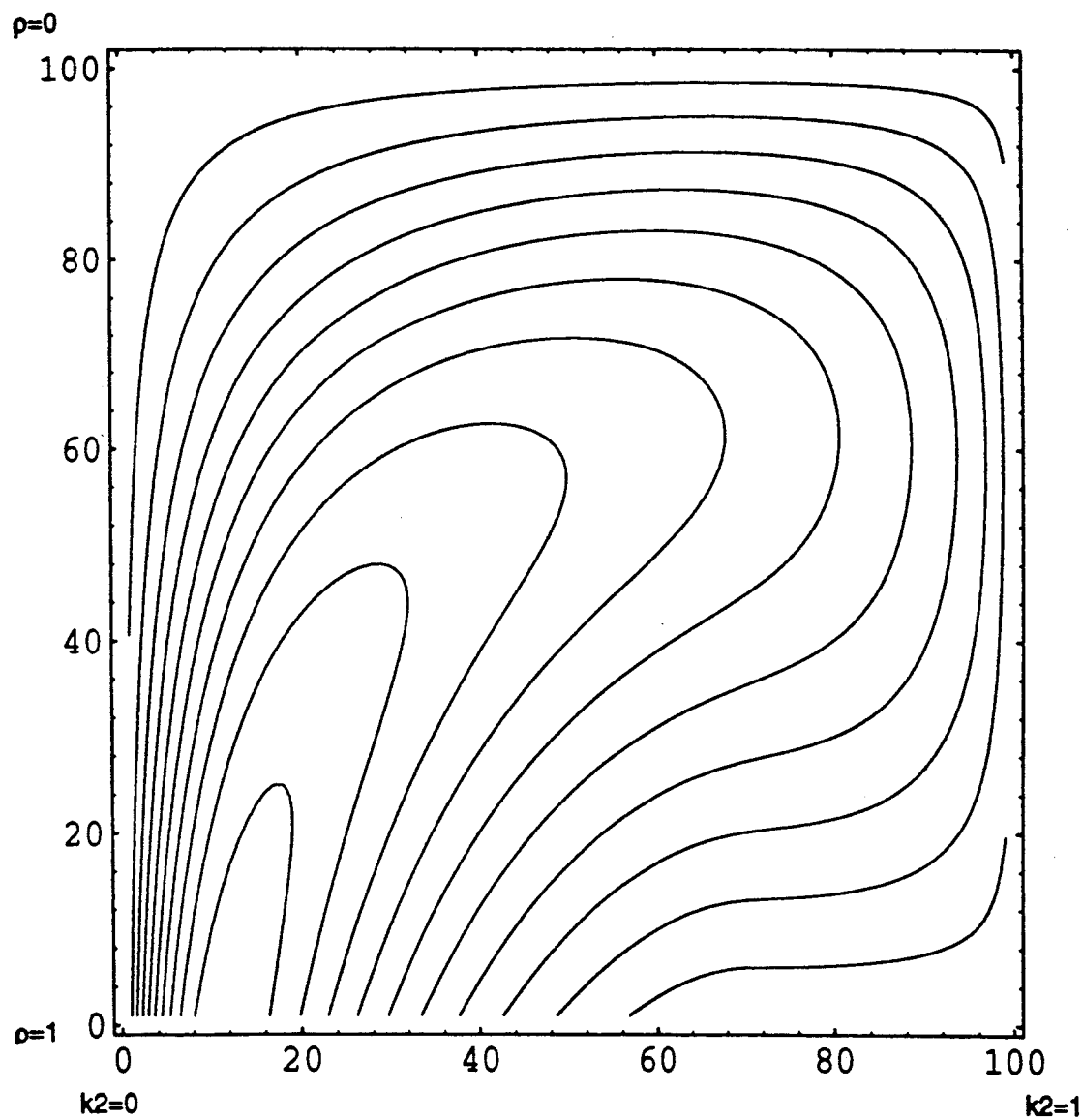
Figure 24:
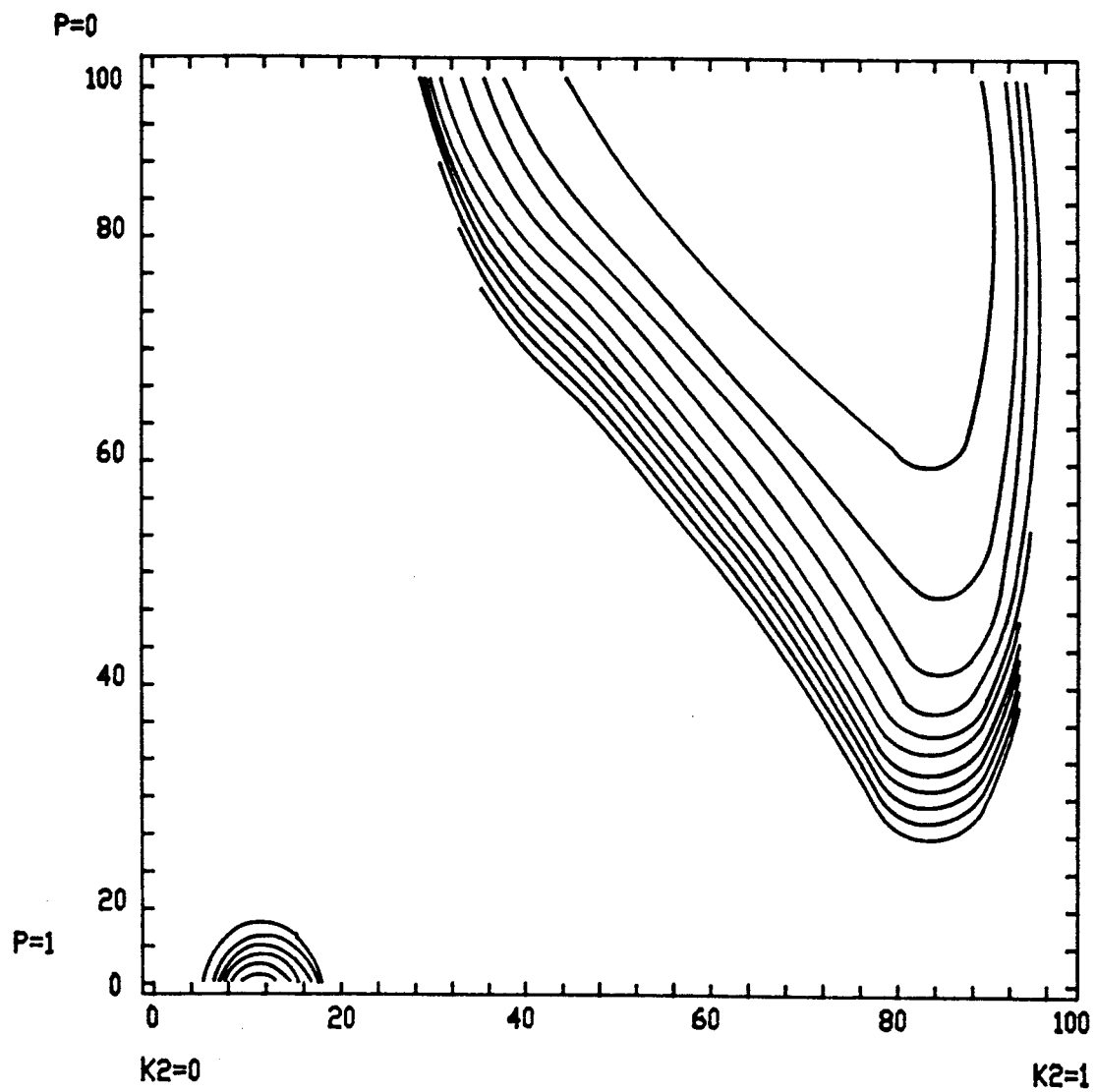
Figure 25:
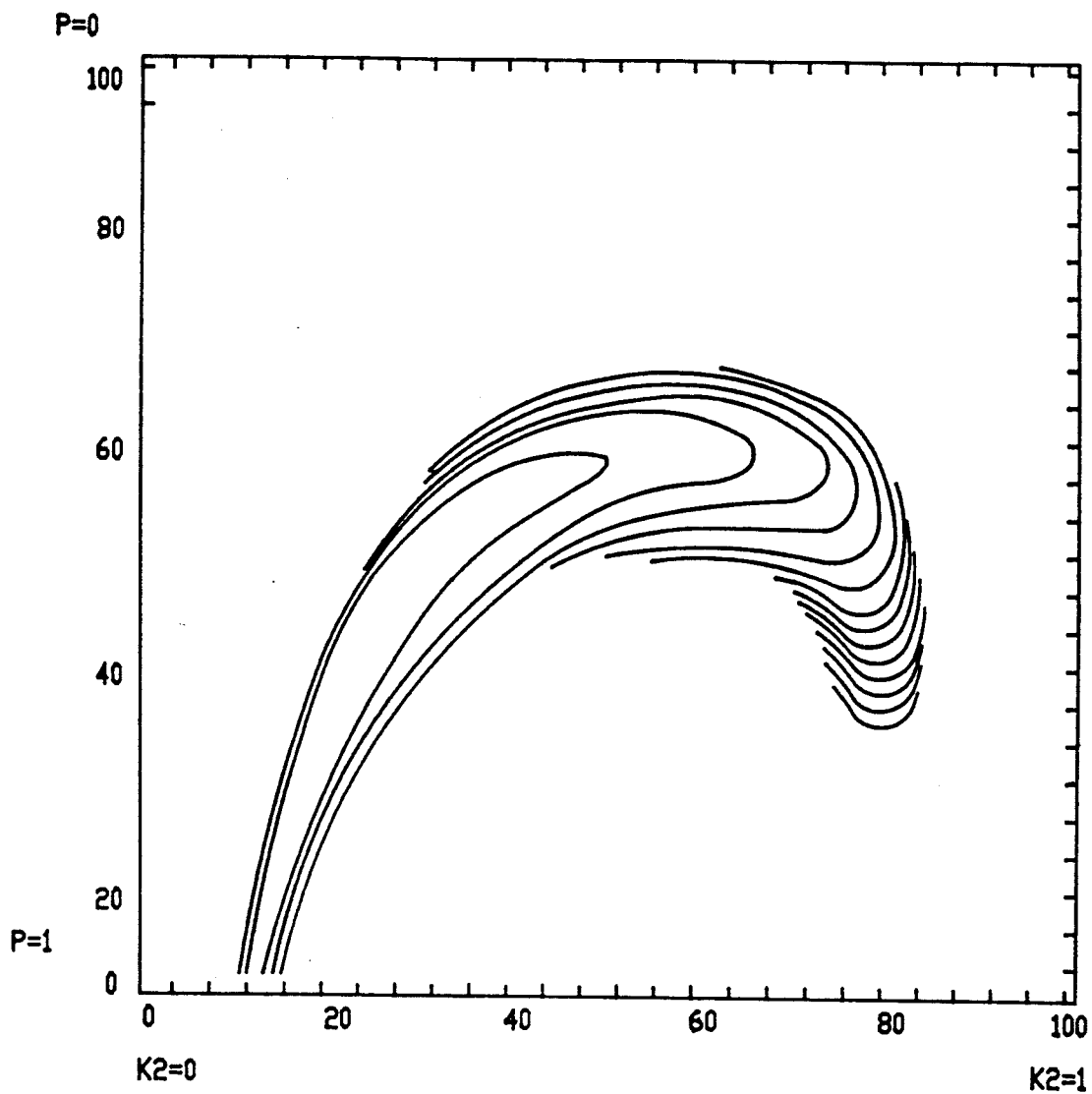
Figure 26:
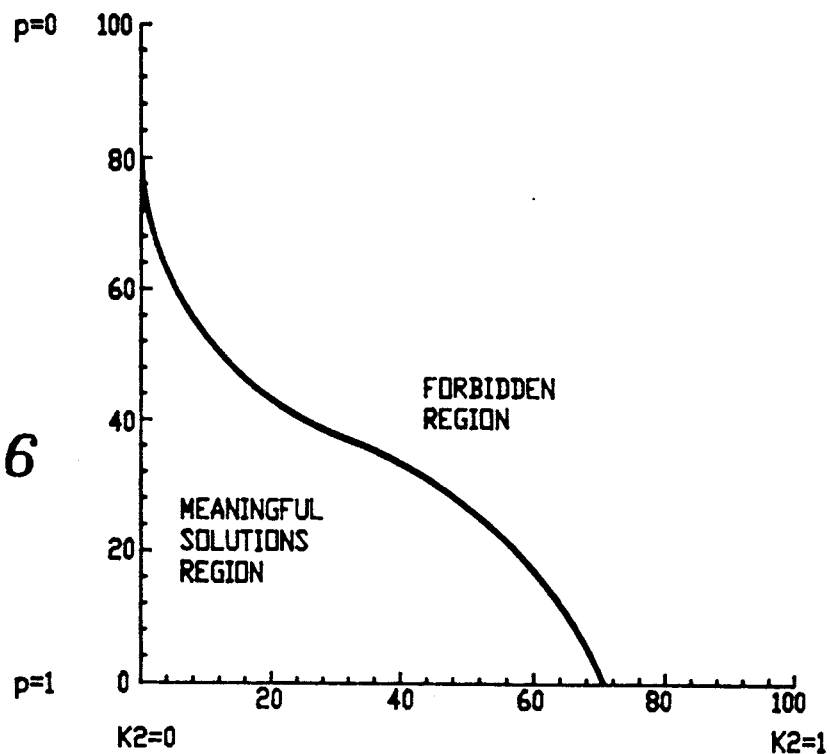

Thus both the minima and maxima respective extrema are the brightest areas. Because of the fact that for every $\rho$ there is a maximum $K_2$ for which the $d_3 = 0$ constraint can be met (FIG. 21), given a particular $\rho$ value there are no solutions with $K_2$ above a certain $K_2^{border}(\rho)$. This effectively amounts to the existence of a forbidden region in the upper right corner of the $K_2 \epsilon [0,1]$, $\rho \epsilon [1,0]$ plots (FIG. 26). This means that the extrema in the upper right corner of FIG. 22 and FIG. 24 are extraneous mathematical solutions. Only the extrema in the lower left corner of all four figures are physically meaningful. Notice the maxima for $d_1$ in both cases $\rho:1$ and $1:\rho$ occur on the lower horizontal axis $\rho = 1$, whereas the (meaningful) minimum for $d_5^{norm}$ in the $\rho:1$ case also occurs on the horizontal $\rho = 1$ axis. The numerical analysis derives both extrema at $$(K_1^{opt}, K_2^{opt}) = (0.1161, 0.7256) \tag{65}$$

with the values $$(d_1)_{\rho:1}^{max} = 0.728745 \tag{66}$$

$$(d_5^{norm})_{\rho:1}^{min} = -0.118189 \tag{67}$$

However in the $1:\rho$ case the minimum for $d_5^{norm}$ seems to be somewhat shifted to the lower left part of the plot whereas the maximum for $d_1$ still occurs on the $\rho = 1$ axis at the same $(K_1^{opt}, K_2^{opt})$ values as for the $\rho:1$ case. The position where the minimum of $d_5^{norm}$ occurs is $$(K_2, \rho)_{1:\rho} = (0.214699, 0.681034) \tag{68}$$

and the value of the minimum is $$(d_5^{norm})_{1:\rho}^{min} = 0.116094 \tag{69}$$

The value of this minimum differs only by a negligible amount of from that of Eq. 67 which occurs for $\rho = 1$. This is also evident from FIG. 26 which shows that the bottom zone of $d_5^{norm}$ is very broad extending down to the $\rho = 1$ axis and enveloping the point $K_2^{opt}$.

In summary, the linear modulation coefficient $d_1$ is maximized at $\rho = 1$. The fifth order distortion $d_5^{norm}$ is substantially minimized at this same value of the splitting coefficient being less than 2% higher than its global minimum. We have already discussed the advantages of working with an antipodal splitter in terms of broadband operation. Therefore the optimum solution taking all considerations into account corresponds to the antipodal electrical splitter, for which there are values of coupling ratios of the two couplers such that the transfer characteristic is simultaneously optimized for maximum modulation efficiency (maximum first order coefficient) and best linearity (null third order coefficient and substantially minimum normalized fifth order coefficient).

At this point it is possible to assess the nonoptimal performance of the previous art work of Skeie and Johnson, which corresponds in our notation to using the 1:$\rho$ configuration with $\rho=0.5$ and with $K_1=K_2=\sin(29°)$, yielding $d_1=\{0.547, -0.132\}$ and $d_5{}^{norm}=-0.13$ which values are respectively worse by 2.5 dB and 0.9 dB than our optimal values.

Next we undertake an analytic derivation and optimization of the nonlinear coefficients in order to verify and further clarify the operation of type II devices with antipodal splitting and to obtain explicit expressions and plots of the optimal transfer characteristics.

Analytic optimization of coupler ratios for best linearity and modulation efficiency in the antipodal splitting case The optimization above has been numerically derived. Once the optimality of antipodal splitting has been established, a full analytical solution is obtainable for the optimization problem. It is instructive to pursue such analysis in order to verify the numerical results and obtain more insight.

Third order cancellation

Consider the transfer characteristic for $\rho=1$ (Eq. 44) which is a Fourier series with two terms. We note that this characteristic is apparently linearizable as the second sine term $\sin(2\phi)$ can be used to cancel the third order nonlinearity of the first sine term $\sin(\phi)$. The power series up to fifth order for the normalized output intensity is readily derived:

$$I = 1 + f_1\left(\phi - \frac{\phi^3}{6} + \frac{\phi^5}{120}\right) - f_2\left(2\phi - \frac{8\phi^3}{6} + \frac{32\phi^5}{120}\right) = 1 + d_1\phi + d_3\phi^3 + d_5\phi^5 \quad (70)$$

with $$d_1 = f_1 - 2f_2 \quad d_3 = \frac{8f_2 - f_1}{6} \quad d_5 = \frac{f_1 - 32f_2}{120} \quad (71)$$

Thus, from Eq. 71, the condition $d_3=0$ yields the following condition on the Fourier coefficients:

$$f_1 = 8f_2 \quad (72)$$

Using Eq. 42 we obtain the following constraint:

$$1 = 4\tan(\gamma_1)\tan(2\gamma_2) \quad (73)$$

upon the satisfaction of which, the third order coefficient vanishes, yielding $$I = 1 + d_1\phi + d_5\phi^5 \quad (74)$$

with $$d_1 = 6f_2 = \frac{3}{4}f_1 = 3\sin^2(\gamma_1)\sin(2\gamma_2) \quad (75)$$

$$d_5 = -\frac{f_2}{5} = -\frac{f_1}{40} = -\frac{d_1}{30}$$

Notice that taking the two RF inputs in phase rather than in anti-phase, $$\phi_1 = \phi_2 = \phi \quad (76)$$

would yield $$I(\phi,\phi) = 1 + f_1\sin(\phi) + f_2\sin(2\phi) \quad (77)$$

which can be shown to yield a third order coefficient which cannot be nulled out since $f_1$ and $f_2$ have the same sign. Thus, the in-phase case does not lead to a solution to the linearization problem.

Optimization of first and fifth order coefficients

Using the results above to compute the fifth order normalized coefficient yields $$d_5^{norm} = \frac{d_5}{d_1^5} = -\frac{1}{30d_1^4} \quad (78)$$

It is apparent that by maximizing the driving efficiency $d_1$ one also simultaneously minimizes the fifth order distortions $d_5$ and $d_5{}^{norm}$. To analytically obtain the actual optimum coupler values $\gamma_1$, $\gamma_2$ one must solve the following optimization problem:

Maximize $d_1(\gamma_1, \gamma_2) = 6\sin^2(\gamma_1)\sin(2\gamma_2)$ (79)

Subject to the constraint $1 = 4\tan(\gamma_1)\tan(2\gamma_2)$ (80)

The analytical solution of the above formulated problem is straightforward:

$$\gamma_1 = 0.81201 \quad \gamma_2 = 0.11637 \quad (81)$$

yielding the following values for the power series coefficients of Eq. 74, $$d_1 = 0.728748 \quad d_5 = -0.0242912 \quad (82)$$

$$d_5^{norm} = \frac{d_5}{d_1^5} = -0.118189$$

The optimum output intensity power series is given by $$I = 1 + 0.728748\phi - 0.0242912\phi^5 \quad (83)$$

The optimum Fourier coefficients are given by $$f_1 = 0.97166 \quad f_2 = 0.121457 \quad (84)$$

and the optimum transfer characteristic given by:

$$I(\phi) = 1 + 0.97166\sin(\phi) - 0.121457\sin(2\phi) \quad (85)$$

represents the best performance possibly attainable with a DBBI device in accordance to the teachings of this invention.

Figure 27:
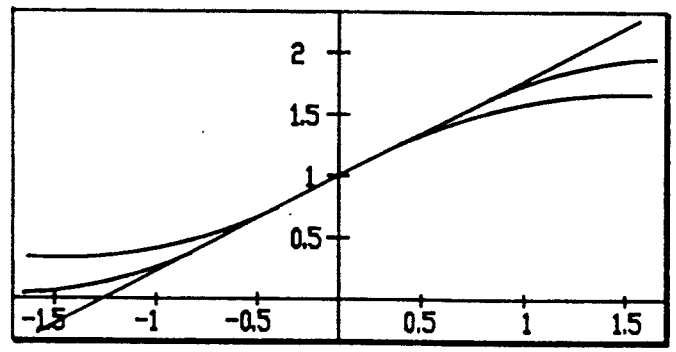
FIG. 27 is a plot describing the light vs. voltage transfer characteristic of an uncompensated Mach-Zehnder device and the optimally tuned DBBI device and a straight tangent line for comparison. The DBBI curve is the one between the straight line and the MZ curve.
Figure 28:
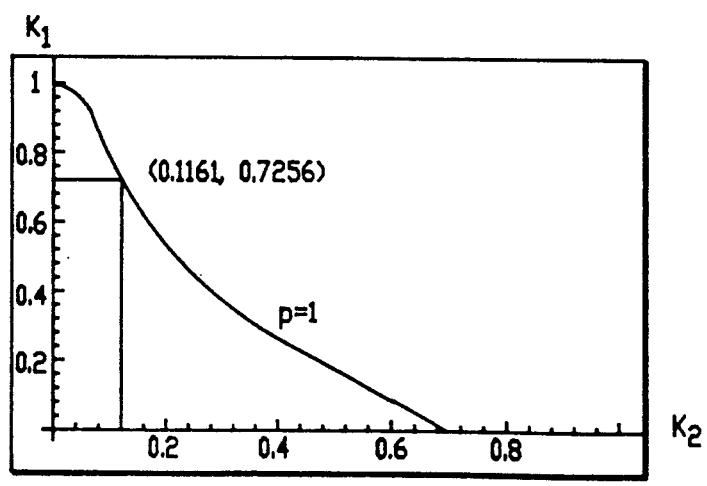
FIG. 28 is a plot in the $K_1$-$K_2$ plane describing the optimal solution. It indicates a point comprising the optimal values for the two coupler cross-over ratios as well as the locus in the plane of all pairs of coupler values for which the third order coefficient is nulled out when an antipodal splitter is used. The optimal point indicated further maximizes the linear modulation coefficient and minimizes the normalized fifth order distortion.

This transfer characteristic is graphically compared to an unlinearized raised sine transfer characteristic and a straight line tangent (FIG. 27).

We claim:

1. An optical modulator comprising
 a plurality of electro-optic modulator stages, each modulator stage having at least one optical waveguide input port and at least one optical waveguide output port, said modulator stages being cascade coupled together in a tandem arrangement such that input ports of one stage are connected to output ports of a previous stage, each modulator stage also having electrode means for applying electrical voltages thereto,
 electrical drive means for applying modulating electrical voltages to said electrode means of each of said modulator stages, said modulating electrical voltages for all modulator stages being derived from a single input electrical signal, said electrical drive means including at least one electrical splitter connected to receive said input electrical signal and adapted to split said received input electrical signal into at least two of said modulating electrical voltages proportional to said single input electrical signal, wherein said electrical splitter comprises a broadband windingless transmission line transformer.

2. An optical modulator comprising
 a plurality of electro-optic modulator stages, each modulator stage having at least one optical waveguide input port and at least one optical waveguide output port, said modulator stages being cascade coupled together in a tandem arrangement such that input ports of one stage are connected to output ports of a previous stage, each modulator stage also having electrode means for applying electrical voltages thereto,
 electrical drive means for applying modulating electrical voltages to said electrode means of each of said modulator stages, said modulating electrical voltages for all modulator stages being derived from a single input electrical signal, said electrical drive means including at least one electrical splitter connected to receive said input electrical signal and adapted to split said received input electrical signal into at least two of said modulating electrical voltages proportional to said single input electrical signal, wherein said at least two modulating electrical voltages are selected to induce antiphase optical retardation modulation signals simultaneously in at least two of said modulator stages, said antiphase optical retardation modulation signals being proportional to said single input electrical signal.

3. The modulator of claim 2 wherein said two modulating voltages have equal amplitudes of modulation.

4. An optical modulator comprising
 a plurality of electro-optic modulator stages, each modulator stage having at least one optical waveguide input port and at least one optical waveguide output port, said modulator stages being cascade coupled together in a tandem arrangement such that input ports of one stage are connected to output ports of a previous stage, each modulator stage also having electrode means for applying electrical voltages thereto, at least one of said modulator stages being a balanced bridge interferometer (BBI) modulator with at least one directional coupler (DC) section therein, wherein at least one directional coupler of at least one said BBI modulator is a $\Delta\beta$ coupler, said at least one $\Delta\beta$ coupler being characterized by a change in a relative phase delay, $\Delta\beta$, between two coupler paths thereof, in addition to a change in a coupling coefficient, $\kappa$, between said coupler paths, in response to a bias voltage applied to said $\Delta\beta$ coupler,
 electrical drive means for applying modulating electrical voltages to said electrode means of each of said modulator stages, and
 means for applying said bias voltage to said $\Delta\beta$ coupler.

5. An apparatus for modulating a light beam comprising
 at least two integrated electro-optic cascaded modulator stages, including an input stage and an output stage, the input modulator stage having an optical waveguide input for receiving a light beam and the output stage having at least one optical waveguide output, at least one of said modulator stages being of the balanced-bridge interferometer type with at least one directional coupler section, each stage having separate bias means, wherein at least one directional coupler of said at least one balanced-bridge interferometer type modulator stage is a $\Delta\beta$ coupler, said at least one $\Delta\beta$ coupler being characterized by a change in a relative phase delay, $\Delta\beta$, between two coupler paths thereof, in addition to a change in a coupling coefficient, $\epsilon$, between said coupler paths, in response to a bias voltage applied to said $\Delta\beta$ coupler,
 means for driving the optical waveguide input of the input stage with a continuous wave light source;
 means for producing antiphase modulation of the light beam in said two stages simultaneously; and
 means for receiving a portion of the light beam emitted from each optical waveguide output of the output stage and deriving therefrom bias signals applied to said bias means, said at least one directional coupler section, including said at least one $\Delta\beta$ coupler, having bias voltages applied thereto which are selected to minimize third and fifth order intermodulation distortions over all possible coupling ratio values.

6. The apparatus of claim 5 wherein said means for deriving said bias signals adjusts said bias signals continuously in response to the received portion of the light beam.

7. The apparatus of claim 5 wherein said means for deriving said bias signal adjusts said bias signals at discrete time intervals.

8. The apparatus of claim 5 further defined by each modulator stage having an interferometer section, at least one interferometer section having an electrode with one of said bias signals applied thereto.

9. The apparatus of claim 8 wherein said means for deriving said bias signals adjusts said bias signals applied to said at least one interferometer section to minimize at least even order intermodulation distortions.

10. The apparatus of claim 5 wherein said coupling ratio is also selected to maximize the linear modulation coefficient over all possible coupling ratio values.

11. The apparatus of claim 5 wherein said third order distortion is substantially nulled and said fifth order distortion is at a minimum non-zero value over all possible coupling ratio values consistent with said third order distortion being substantially nulled.

12. The apparatus of claim 11 wherein said coupling ratio is also selected to maximize the linear modulation coefficient over all possible coupling ratio values.

13. The apparatus of claim 5, wherein at least one of said modulator stages is a balanced-bridge interferometer having first and second coupler sections, each coupler section having a cross over ratio substantially equal to 0.5.

14. An optical modulator comprising
a first electro-optic modulator stage having an optical waveguide input port, N optical waveguide output ports and a first electrical port, said first modulator stage characterized by a first $1 \times N$ transfer matrix,
a second electro-optic modulator stage having N optical waveguide input ports, M optical waveguide output ports and a second electrical port, said second modulator stage characterized by a second $N \times M$ transfer matrix said N input ports of said second modulator stage being butt coupled to said N output ports of said first modulator stage, and
an electrical splitter having an input connected to receive an input electrical signal and having two electrical output terminals connected to said first and second electrical ports for applying respective first and second modulating voltages thereto, said modulating voltages being voltages derived from said input electrical signal,
wherein at least one of said modulator stages is a balanced-bridge interferometer (BBI) modulator with at least one directional coupler (DC) section therein, at least one directional coupler of at least one said BBI modulator being a $\Delta\beta$ coupler having means for applying a bias voltage thereto, said at least one $\Delta\beta$ coupler being characterized by a change in a relative phase delay, $\Delta\beta$, between two coupler paths thereof, in addition to a change in a coupling coefficient, $\kappa$, between said coupler paths, in response to said bias voltage applied to said $\Delta\beta$ coupler, the transfer matrix characterizing the BBI modulator stage with at least one $\Delta\beta$ coupler being a function of at least the bias voltage applied to the $\Delta\beta$ coupler of that modulator stage, said first $1 \times N$ transfer matrix and said second $N \times M$ transfer matrix having been selected such that at least one power series coefficient for an overall transfer characteristic between said input port of said first modulator stage and at least one of said M output ports of said second modulator stage is minimized.

15. The modulator of claim 14 wherein all even order power series coefficients for said overall transfer characteristic are essentially nulled by said selection of said transfer matrices.

16. The modulator of claim 14 wherein the third order power series coefficient for said overall transfer characteristic is essentially nulled by said selection of said transfer matrices.

17. The modulator of claim 14 wherein the fifth order power series coefficient for said overall transfer characteristic is minimized by said selection of said transfer matrices.

18. The modulator of claim 14 wherein N is selected from the set of integers consisting of 1 and 2, and wherein M is selected from the set of integers consisting of 1 and 2.

19. An optical modulator comprising
a first electro-optic modulator stage having an optical waveguide input port, N optical waveguide output ports and a first electrical port, said first modulator stage characterized by a first $1 \times N$ transfer matrix,
a second electro-optic modulator stage having N optical waveguide input ports, M optical waveguide output ports and a second electrical port, said second modulator stage characterized by a second $N \times M$ transfer matrix, said N input ports of said second modulator stage being butt coupled to said N output ports of said first modulator stage, and
an electrical splitter having an input connected to receive an input electrical signal and having two electrical output terminals connected to said first and second electrical ports for applying respective first and second modulating voltages thereto, said modulating voltages being voltages derived from said input electrical signal, said first $1 \times N$ transfer matrix and said second $N \times M$ transfer matrix having been selected such that at least one power series coefficient for an overall transfer characteristic between said input port of said first modulator stage and at least one of said M output ports of said second modulator stage is minimized, wherein said electrical splitter comprises a broadband windingless transmission line.

20. The modulator of claim 19 wherein said transmission line is a coaxial cable with an outer conductor shorted at one end to ground and sheathed in ferrite material.

21. A linear electro-optic integrated modulator comprising:
a first modulating stage of a $1 \times 2$ interferometer-type electro-optic modulator device, said first stage having an optical waveguide input port, a Y-junction splitter with two waveguide outputs, a first interferometer section including two noninteracting optical waveguides, each optical waveguide having an input port and an output port, said input port, of said two noninteracting optical waveguides being butt coupled to said two waveguide outputs of said Y-junction splitter, said first interferometer section also having modulation and bias means, and a $2 \times 2$ optical connecting port with two optical input waveguides and two optical output wave-guides, said two optical input waveguides of said connecting port being butt coupled to said output ports of said two noninteracting optical waveguides of said first interferometer section, said two optical output waveguides of said connecting port forming two optical waveguide output ports of said first modulating stage,
a second modulating stage of a $2 \times M$ interferometer-type electro-optic modulator device, wherein values for M are selected from the set consisting of the integers 1 and 2, the second stage having a second interferometer section including two noninteracting optical waveguides, each optical waveguide having an input port and an output port, said input ports of said two noninteracting optical waveguides of said second interferometer section forming two optical waveguide input ports of said second modulating stage and being butt coupled to said two optical waveguide output ports of said first modulating stage, said second interferometer section also having modulation means, and a 2×M optical multiport with two optical input waveguide ports and M optical output waveguide ports, said two optical input waveguide ports of said multiport being butt coupled to said two optical waveguide output ports of said second interferometer section, said M optical output waveguide ports of said multiport forming M output ports of said second modulating stage, means for receiving a modulating electrical signal and deriving therefrom first and second output signals which are linearly related to said modulating electrical signal, said receiving means being connected to provide said output signals, respectively, to the modulation means of the first and second stages; and means for generating individual bias signals, said bias signals being connected, respectively, to bias means of at least one of said first and second modulating sections, voltage levels of said bias means being mutually adjusted to minimize even-order intermodulation distortions over all possible coupling ratio values, and to minimize third order intermodulation distortion terms in said optical waveguide output over all possible coupling ratio values, whereby, when a continuous-wave light source is connected to the modulator optical waveguide input port and an electrical modulating signal is connected to the signal splitting means, the light emitting from the at least one optical waveguide output port is modulated by the modulating signal.

22. The modulator of claim 21 wherein said 2×2 optical connecting port is an optical directional coupler.

23. The modulator of claim 21 wherein said 2×2 optical connecting port comprises a Y-junction combiner with two input waveguide ports forming the two optical input waveguides of the connecting port and with an output port, and a Y-junction splitter with an input port butt coupled to the output port of the Y-junction combiner and with two output wave-guide ports forming the two optical output waveguides of the connecting ports.

24. The modulator of claim 21 wherein M=2 and said 2×M optical multiport comprises a 2×2 directional coupler.

25. The modulator of claim 21 wherein M=1 and said 2×M optical multiport comprises a 2×1 Y-junction combiner.

26. The modulator of claim 21 wherein said modulation and bias means comprises electrode means for generating electric fields that substantially overlap said optical waveguides of said interferometer sections and that modulate light by an electro-optic effect, said electric fields being proportional to a modulating voltage applied to said electrode means.

27. The modulator of claim 21 wherein all even order intermodulation distortions are substantially nulled.

28. The modulator of claim 21 wherein the third order intermodulation distortion is substantially nulled.

29. The modulator of claim 21 wherein the fifth order intermodulation distortion is minimized.

30. An integrated electro-optic modulator comprising:

an input Y-junction having an optical input port for receiving light and having a pair of optical outputs;

a first interferometer section having a pair of waveguides forming optical paths connected to receive light from the Y-junction optical outputs, said interferometer section having a pair of optical outputs, said interferometer section having modulating electrodes disposed thereon for receiving an electrical modulating signal such that light traversing at least one optical waveguide is modulated in response to said electrical modulating signal, said interferometer section also having a bias means for receiving an electrical bias signal;

a first directional coupler section having a pair of optical waveguides, said directional coupler having a predetermined coupling ratio, the coupler optical waveguides being connected to receive the optical outputs of the first interferometer section, and having a pair of optical outputs, said coupler section having a bias means for receiving an electrical bias signal;

a second interferometer section of like structure to the first interferometer section and having its waveguides connected to receive the optical outputs of the first directional coupler;

a second directional coupler of like structure to the first directional coupler and having its optical paths connected to receive the optical outputs of the second interferometer section, said coupler having a pair of optical outputs, said outputs comprising a pair of modulator optical output ports;

means for receiving an electrical modulating signal and deriving therefrom a pair of signals for connection, respectively to the modulating electrodes of at least one of the first and second interferometer sections; and means for biasing first and second interfero meter sections and at least one directional coupler to voltage levels adjusted to minimize intermodulation distortion terms in the optical outputs and to maximize the linear modulation efficiency, wherein at least one of said directional couplers is a $\Delta\beta$ coupler characterized by a change in a relative phase delay, $\Delta\beta$, between two coupler paths thereof, in addition to a change in a coupling coefficient, $\kappa$, between said coupler paths, in response to a bias voltage applied to said $\Delta\beta$ coupler, said biasing means adjusting the voltage level applied to said $\Delta\beta$ coupler to minimize at least a third order intermodulation distortion term and adjusting the voltage level applied to at least one of said interferometer sections to minimize even order intermodulation distortion terms for the particular bias voltage level applied to said $\Delta\beta$ coupler.

31. An integrated modulator as in claim 30 further including an RF splitter for receiving an RF modulation signal and for supplying first and second electrical signals for connection to the modulating electrodes of first and second interferometer sections, respectively, said electrical signals being related in phase such that each of said electrical signals modulates the light traversing its respective interferometer section so that the optical outputs therefrom are substantially 180 degrees out of phase with respect to the other.

32. An integrated modulator as in claim 31 further including an electrical delay means, associated with electrical signal transport means connecting outputs of said RF splitter to said interferometer biasing means, for fine adjustment of said phase of said electrical signals such that propagation delays experienced by light in said two interferometer sections are compensated.

33. An optimal modulator comprising
a first electro-optical modulator stage having an optical waveguide input port, two optical waveguide output ports and a first electrical port, said first modulator stage characterized by a first $1 \times 2$ transfer matrix,
a first branch of a second electro-optic modulator stage having two optical waveguide input ports, M optical waveguide output ports and a second electrical port, said first branch characterized by a second $K \times M$ transfer matrix one of said input ports of said first branch being butt coupled to a first one of said two output ports of said first modulator stage,
a second branch of said second electro-optic modulator stage of like structure to said first branch having K optical waveguide input ports, N optical waveguide output ports and a third electrical port, said branch characterized by a third $K \times N$ transfer matrix one of said input ports of said second branch being butt coupled to a second one of said two output ports of said first modulator stage, and
an electrical splitter forming a linear electrical network having an input connected to receive an input electrical signal and having three electrical output terminals connected to said first, second and third electrical ports for applying respective first, second and third modulating voltages thereto, said modulating voltages being voltages derived from said input electrical signal and selected to minimize intermodulation distortions of at least one order.

34. The modulator of claim 33 wherein M is selected from the group consisting of the integers 1 and 2, and wherein N is also selected from the group consisting of the integers 1 and 2.

35. The optical modulator of claim 33 wherein K is a value selected from the set of integers consisting of 1 and 2.

36. The optical modulator of claim 33 wherein said selected modulating voltages substantially null all even order intermodulation distortions.

37. The optical modulator of claim 33 wherein said selected modulating voltages substantially null third order intermodulation distortion.

38. The optical modulator of claim 37 wherein said selected modulating voltages minimize fifth order intermodulation distortion.

* * * * *

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 3, line 36, "and" should read -- where --.

Col. 4, line 55, "C $[\kappa\delta]$" should read -- C $[\kappa,\delta]$ --.

Col. 6, line 33, "$\Delta_\kappa$" should read -- $\Delta\kappa$ --.

Col. 10, line 2, "and RF splitter" should read -- an RF splitter --.

Col. 11, line 64, "is that is may" should read -- is that it may --.

Col. 12, line 58, "$\Delta\epsilon$" should read -- $\Delta\beta$ --.

Col. 13, lines 53-54, "response" should read -- responses --.

Col. 14, line 53, "pad of course" should read -- pad is of course --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 16, line 28, "receiver 125 closed" should read -- receiver 125 and closed --.

Col. 16, line 39, "are either in-phase and are equal" should read -- are either in-phase or anti-phase and are equal --.

Col. 17, line 20, "has the same as the outside" should read -- has the same effect as the outside --.

Col. 18, line 15, "$\Delta\delta$" should read -- $\Delta\kappa$ --.

Col. 19, line 14, "DE" should read -- DC --.

UNITED STATES PATENT AND TRADEMARK OFFICE
CERTIFICATE OF CORRECTION

PATENT NO.  : 5,278,923
DATED       : January 11, 1994
INVENTOR(S) : Moshe Nazarathy et al.

It is certified that error appears in the above-indentified patent and that said Letters Patent is hereby corrected as shown below:

Col. 20, line 39, equation (32),

" $P(\phi_1,\phi_2)=\overline{P}[1\pm\alpha_1 \sin (\phi_1) \square 1\pm\alpha_2 \sin (\phi_2)]$ "

should read

-- $P(\phi_1,\phi_2)=\overline{P}[1\pm\alpha_1\sin(\phi_1)] [1\pm\alpha_2\sin(\phi_2)]$ --.

Col. 20, line 43, equation (33),

" $\overline{P} = \dfrac{P_{in}}{2\Lambda}$ "

should read

-- $\overline{P} = \dfrac{P_{in}}{4\Lambda}$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 21, line 24, "matrix for DBBI" should read -- matrix for a DBBI --.

Col. 21, line 34, equation (37),

" $M=C[\kappa_2,0]F[\phi_2]C[\kappa_1 0]F[\phi_1]$ "

should read

-- $M=C[\kappa_2,0]F[\phi_2]C[\kappa_1,0]F[\phi_1]$ --.

Col. 21, lines 40 and 41, equation (38),

" $E'_1 = -K_1 K_2 e^{j(\phi_1-\phi_2)/2} + j\hat{K}_1 K_2 e^{j(-\phi_1-\phi_2)/2} + jK_1\hat{K}_2 e^{j(-\phi_1-\phi_2)/2} + \hat{K}_1\hat{K}_2 e^{j(\phi_1 30 \phi_2)/2}$ "

should read

-- $E'_1 = -K_1 K_2 e^{j(\phi_1-\phi_2)/2} + j\hat{K}_1 K_2 e^{j(-\phi_1-\phi_2)/2} + jK_1\hat{K}_2 e^{j(-\phi_1+\phi_2)/2} + \hat{K}_1\hat{K}_2 e^{j(\phi_1+\phi_2)/2}$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 22, lines 45-46, equation (46),

" $E' = \hat{K}_1\hat{K}_2 e^{j\alpha 1} + j\hat{K}_1 K_2 e^{j\alpha 2} - K_1\hat{K}_2 e^{j\phi} e^{j\alpha 3} + jK_1 K_2 e^{-j\phi} e^{j\alpha 4}$ "

should read

-- $E'_1 = \hat{K}_1\hat{K}_2 e^{j\alpha_1} + j\hat{K}_1 K_2 e^{j\alpha_2} - K_1 K_2 e^{j\phi} e^{j\alpha_3} + jK_1\hat{K}_2 e^{-j\phi} e^{j\alpha_4}$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 22, line 60, equation (49),

" $I_0 = 1 + (G_2^2 - 1) \cos^2(\Gamma_1) \quad \phi' = \phi + \Delta\phi$ "

should read

-- $I_0 = 1 + (G_2^2 - 1)\cos^2(\Gamma_1) \quad \phi' = \phi + \Delta\phi$ --.

Col. 22, line 62, equation (50),

" $G_2 e^{j\Gamma_2} = \cos(\Gamma_2)e^{j\alpha 1} + \sin(\Gamma_2)e^{j\alpha 2}$ "

should read

-- $G_2 e^{j\Gamma_2} = \cos(\Gamma_2)e^{j\alpha_1} + \sin(\Gamma_2)e^{j\alpha_2}$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 22, line 64, equation (51),

" $f'_{1s} = G_2 \sin(2\Gamma_1) \cos(\Gamma'_2 + \Gamma_2)\ f'_{1c} = G_2 \sin(2\Gamma_1) \sin(\Gamma'_2 - \Gamma_2)$ "

should read

-- $f'_{1s} = G_2 \sin(2\Gamma_1) \cos(\Gamma'_2 + \Gamma_2)$ $f'_{1c} = G_2 \sin(2\Gamma_1) \sin(\Gamma'_2 - \Gamma_2)$ --.

Col. 23, line 46, equation (53),

" $\eta_1 = -\Delta_1\ \ \eta_2 = \Delta_1 + \Delta_2$ "

should read

-- $\eta_1 = -\Delta_1 \qquad \eta_2 = \Delta_1 + \Delta_2$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 24, line 8, "by injection" should read -- by injecting --.

Col. 24, line 39, equation (54),

" $I(\phi) = [1 + \alpha_1 \sin(\phi + \eta_1)][1 = \alpha_2 \sin(-\phi + \eta_2)]$ "

should read

-- $I(\phi) = [1 + \alpha_1 \sin(\phi + \eta_1)][1 + \alpha_2 \sin(-\phi + \eta_2)]$ --.

UNITED STATES PATENT AND TRADEMARK OFFICE
CERTIFICATE OF CORRECTION

PATENT NO. : 5,278,923  
DATED : January 11, 1994  
INVENTOR(S) : Moshe Nazarathy et al.

It is certified that error appears in the above-indentified patent and that said Letters Patent is hereby corrected as shown below:

Col. 24, line 51, equation (55),

" $\eta_1 = 0.226681 \quad \eta_2 = -1.34412 \quad a_1 = 1 a_2 = 0.230645$ "

should read

-- $\eta_1 = 0.226681 \quad \eta_2 = -1.34412 \quad \alpha_1 = 1 \quad \alpha_2 = 0.230645$ --.

Col. 24, lines 56-57, equation (56),

" $I(\phi) = 0.949 + 0.692\phi + 1.145 \times 10^{-6}\phi^2 - 4.17 \times 10^{-7}\phi^{-3} - 3.649 \times 10^{-7}\phi^4 - 0.023\phi^5$ "

should read

-- $I(\phi) = 0.949 + 0.692\phi + 1.145 \times 10^{-6}\phi^2 - 4.17 \times 10^{-7}\phi^{-3} - 3.649 \times 10^{-7}\phi^4 - 0.023\phi^5$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 25, line 32, equation (57),
" $\phi_1 = -\rho\phi, \quad \phi_2 = \phi$ "

should read

-- $\phi_1 = -\rho\phi, \qquad \phi_2 = \phi$ --.

Col. 25, line 41, equation (59),
" $\phi_1 = \phi, \quad \phi_2 = -\rho\phi$ "

should read

-- $\phi_1 = \phi, \qquad \phi_2 = -\rho\phi$ --.

Col. 28, line 42, equation (81),
" $\gamma_1 = 0.81201 \gamma_2 = 0.11637$ "

should read

-- $\gamma_1 = 0.81201 \qquad \gamma_2 = 0.11637$ --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Col. 28, line 60, equation (84),

" $f_1 = 0.97166 f_2 = 0.121457$ "

should read

-- $f_1 = 0.97166 \quad f_2 = 0.121457$ --.

Claim 5, col. 30, line 30, the symbol "$\epsilon$" should read -- $\kappa$ --.

Claim 21, col. 32, line 49, "wave-guides" should read -- waveguides --.

UNITED STATES PATENT AND TRADEMARK OFFICE
CERTIFICATE OF CORRECTION

PATENT NO. : 5,278,923
DATED : January 11, 1994
INVENTOR(S) : Moshe Nazarathy et al.

It is certified that error appears in the above-indentified patent and that said Letters Patent is hereby corrected as shown below:

Claim 23, col. 33, line 42, "wave-guide" should read -- waveguide --.

Signed and Sealed this

Sixteenth Day of August, 1994

Attest:

BRUCE LEHMAN

*Attesting Officer*   *Commissioner of Patents and Trademarks*